(12) United States Patent
Yamada et al.

(10) Patent No.: US 10,311,484 B2
(45) Date of Patent: Jun. 4, 2019

(54) DATA PROCESSING DEVICE AND DATA PROCESSING METHOD

(71) Applicant: YAHOO JAPAN CORPORATION, Tokyo (JP)

(72) Inventors: Kouji Yamada, Tokyo (JP); Hiroaki Miyanaga, Tokyo (JP); Tetsuya Hibino, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 1275 days.

(21) Appl. No.: 14/487,626

(22) Filed: Sep. 16, 2014

(65) Prior Publication Data
US 2015/0248708 A1 Sep. 3, 2015

(30) Foreign Application Priority Data

Mar. 3, 2014 (JP) .................. 2014-041025

(51) Int. Cl.
G06Q 30/02 (2012.01)
(52) U.S. Cl.
CPC .................. G06Q 30/0269 (2013.01)
(58) Field of Classification Search
CPC .................. G06Q 30/00; G06Q 30/02
USPC ........................ 715/236; 705/14.25
See application file for complete search history.

(56) References Cited

U.S. PATENT DOCUMENTS 5,694,608 A * 12/1997 Shostak ............ G06F 17/30554
715/236

9,946,792 B2 * 4/2018 Jain .................. G06F 17/30864
2003/0105669 A1 * 6/2003 Tsuchiya ................ G06Q 30/02
705/14.25

FOREIGN PATENT DOCUMENTS

| JP | H10-222409 A | 8/1998 |
| JP | 2002-108594 A | 4/2002 |
| JP | 2007-316771 A | 12/2007 |
| JP | A-2010-113542 | 5/2010 |
| JP | 2013-012037 A | 1/2013 |

OTHER PUBLICATIONS

Oct. 13, 2015 Office Action issued in Japanese Patent Application No. 2014-041025.
May 10, 2016 Office Action issued in Japanese Patent Application No. 2014-041025.
Feb. 24, 2015 Office Action issued in Japanese Application No. 2014-041025.
Aug. 15, 2017 Office Action issued in Japanese Patent Application No. 2016-147166.

* cited by examiner

Primary Examiner — Marilyn G Macasiano
(74) Attorney, Agent, or Firm — Oliff PLC

(57) ABSTRACT

A data processing device according to the present application includes a reception unit, a first memory unit, a second memory unit, and a storage unit. The reception unit receives user information relating to a user using a user terminal by being triggered upon an access of the user terminal to an information providing device. The first memory unit stores the user information that is received by the reception unit. The storage unit stores the user information in a management area of a second memory unit that is different for each information providing device that is a trigger for reception of the user information stored in the first memory unit.

11 Claims, 14 Drawing Sheets

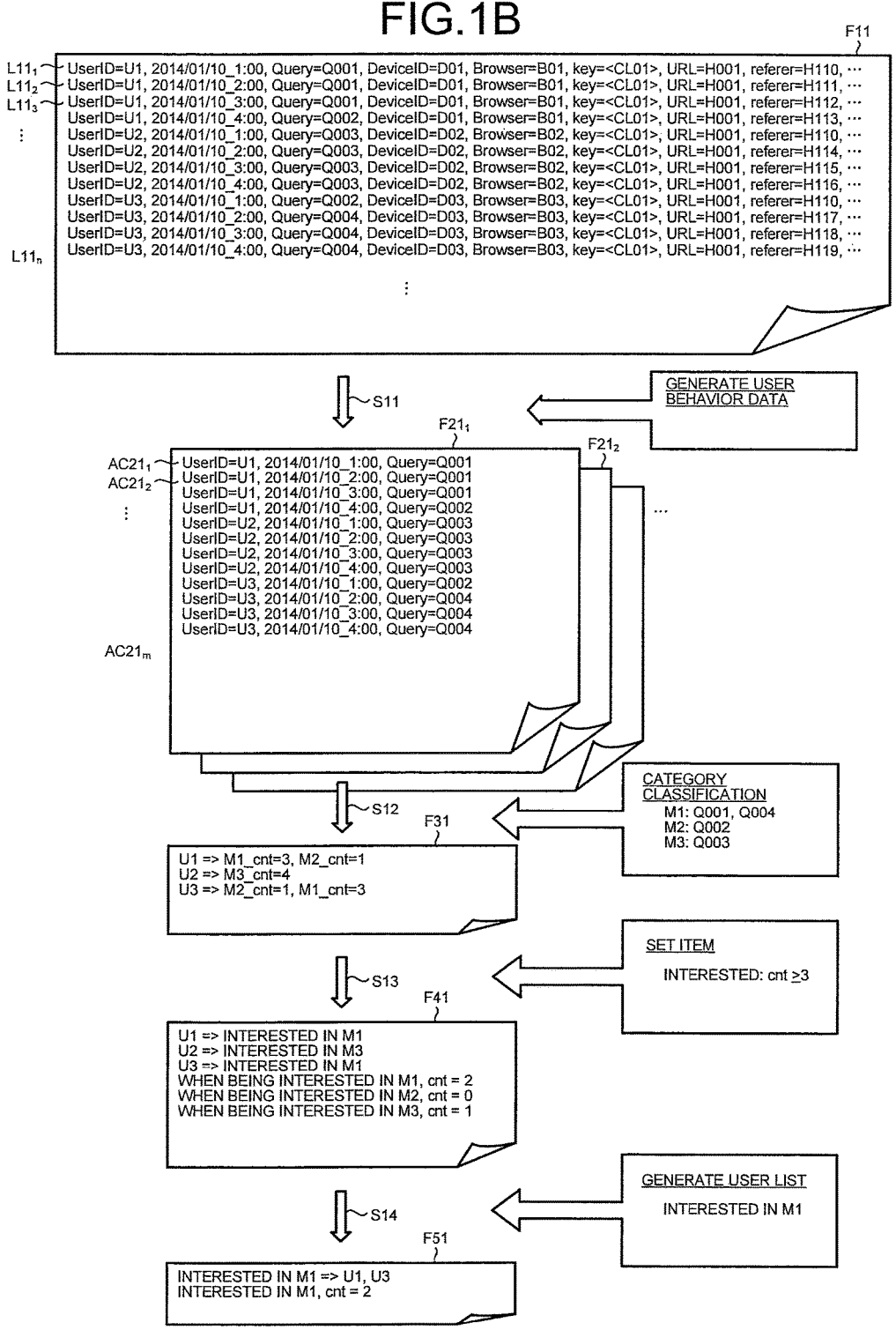

DATA PROCESSING DEVICE AND DATA PROCESSING METHOD

CROSS-REFERENCE TO RELATED APPLICATIONS

The present application claims priority to and incorporates by reference the entire contents of Japanese Patent Application No. 2014-041025 filed in Japan on Mar. 3, 2014.

BACKGROUND OF THE INVENTION

1. Field of the Invention

The present invention relates to a data processing device, a data processing method, and a data processing program.

2. Description of the Related Art

Recently, in accordance with remarkable widespread of the Internet, an advertisement delivery through the Internet is actively performed. As such an advertisement delivery, there is a scheme in which icons representing, for example, companies, products, and the like are displayed at predetermined positions on a web page, and, in a case where such an icon is clicked, a transition to the web page of the advertiser is made.

In such an advertisement delivery, in order to improve the advertising effect, a targeted delivery is performed in which user attributes such as a taste, sex, age, an address, an occupation, and the like of each user are registered in advance, and an advertisement corresponding to the user attributes is selectively delivered. Similarly, a technology is known in which read information acquired when a user terminal accesses an arbitrary web site and user information such as a use history of a search engine are used for a targeted delivery.

However, according to the above-described conventional technology, it is difficult to manage the user information in a flexible manner. More specifically, since the user information is configured by read information acquired when a user terminal accesses a web site and the like, the user information is incessantly transmitted to a device that processes the user information. Accordingly, for example, in a processing device that manages a plurality of pieces of the user information in a data management platform (DMP) business or the like, user information data having a huge amount of information is handled. Accordingly, for the user information accumulated in the processing device, it is difficult to respond to the individual deletion or restoration of the user information data, the speedy analysis of the user information according to a request from an advertiser, or the like. As above, in the conventional technology, the user information is not managed in a flexible manner in an advertisement delivery.

The present application is devised in consideration of the description presented above, and an object thereof is to provide a data processing device, a data processing method, and a data processing program that are capable of managing user information in a flexible manner.

SUMMARY OF THE INVENTION

According to the exemplary embodiment, a data processing device includes a reception unit configured to receive user information relating to a user using a user terminal by being triggered upon an access of the user terminal to an information providing device and a storage unit configured to store the user information in a management area of a second memory unit that is different for each information providing device that is a trigger for reception of the user information stored in a first memory unit that stores the user information received by the reception unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1B is a diagram that illustrates an overview of data processing according to an embodiment;

DETAILED DESCRIPTION OF THE PREFERRED EMBODIMENTS

Figure 1A:
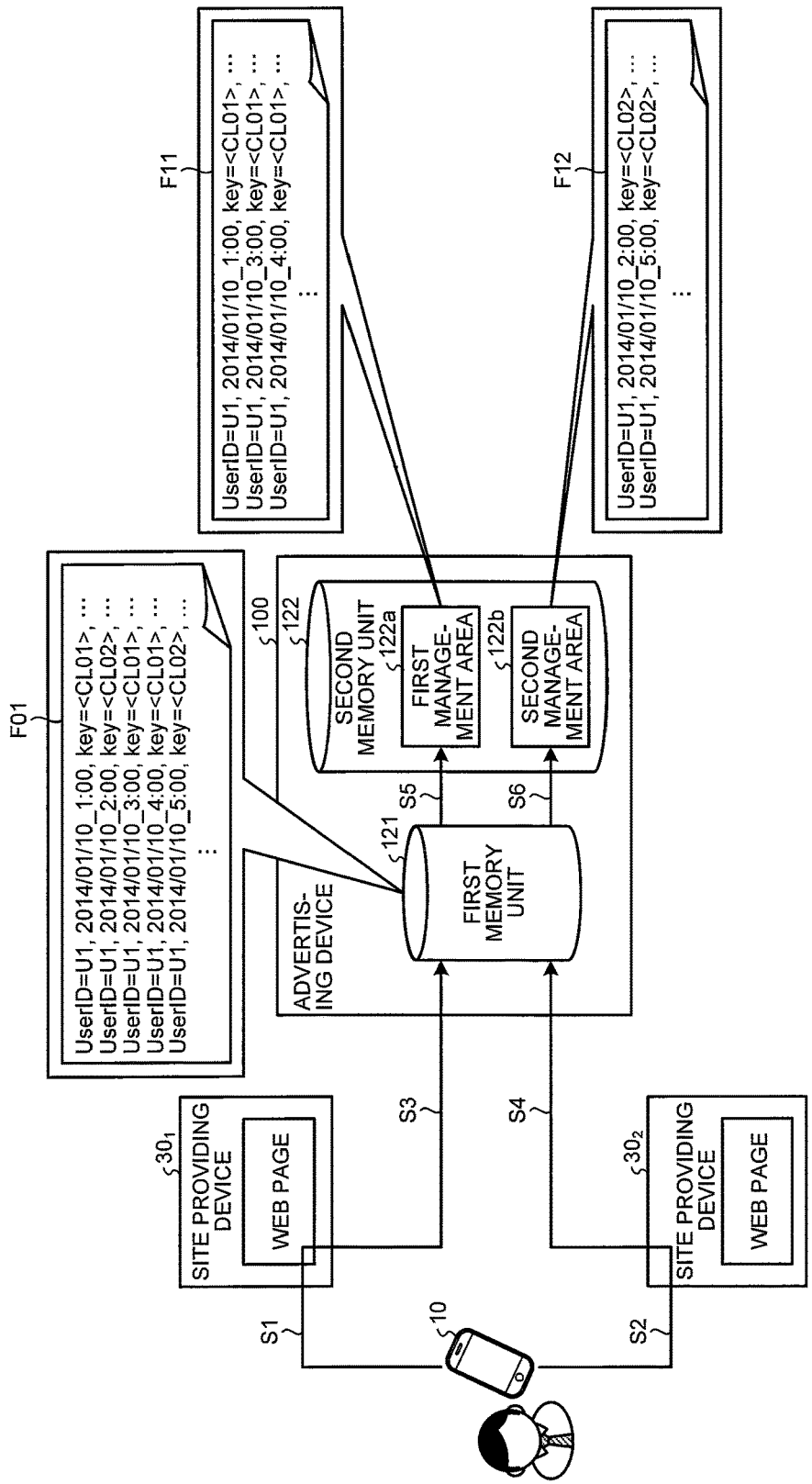
FIG. 1A is a diagram that illustrates an example of data processing according to an embodiment.

Hereinafter, embodiments for a data processing device, a data processing method, and a data processing program relating to the present application (hereinafter, referred to as an embodiment) will be described in detail with reference to the drawings. However, the data processing device, the data processing method, and the data processing program relating to the present application are not limited thereto. In addition, the embodiments may be appropriately combined in a range in which the processing contents thereof are not contradictory to each other. In the embodiments described below, like reference numerals in the drawings denote like elements, and duplicate description thereof will not be presented.

1-1. Data Processing (1)

First, an example of data processing according to an embodiment will be described with reference to FIG. 1A.

FIG. 1A is a diagram that illustrates an example of the data processing according to the embodiment. FIG. 1A illustrates an example in which the data processing of user information is performed by an advertising device 100 that corresponds to the data processing device according to the present application. Here, the user information has a concept including information of a user terminal 10 that is an information processing terminal, attributes of a user operating the user terminal 10, and log data acquired when the user terminal 10 accesses a web site (including transmission of a request for acquiring the information of a web page, transmission of a request for purchasing a product on a shopping page, and the like). In the data processing according to the embodiment, the user information, mainly, represents log data acquired when the user terminal 10 accesses the web site.

Here, the advertising device 100 is an information processing device that provides an advertisement delivery having high advertising effect for an advertiser by using the user information. An advertiser (for example, a company handling products or the like) requesting the advertising device 100 to deliver an advertisement desires an advertisement delivery having high targeting effect according to users by using the user information. In other words, the advertising device 100, in response to the desire of the advertiser, analyzes the user information transmitted from a terminal operated by a user and uses the user information for the advertisement delivery. However, the user information transmitted from a plurality of users has a huge amount of information, and requests relating to the use of the user information that is transmitted from a plurality of advertisers to the advertising device 100 are in a wide range. Thus, the advertising device 100 manages the user information appropriately and flexibly by performing data processing described below.

A site providing device $30_1$ illustrated in FIG. 1A, for example, is a web server. In addition, a site providing device $30_2$ is a web server operated by another manager different from that of the site providing device $30_1$ and provides a web site different from that of the site providing device $30_1$.

In addition, in a web page configuring a web site that is provided by the site providing device $30_1$ or the site providing device $30_2$, a notification function relating to the user information that is realized by a web beacon or the like is embedded. For example, the web beacon has a function for allowing the user terminal 10 accessing the web page to access a transparent image or a very small image (it may be referred to as a "clear GIF") that is stored inside the advertising device 100. Accordingly, the advertising device 100 can receive the user information from the user terminal 10. In the information acquired by the advertising device 100 from the user terminal 10 in accordance with the web beacon that is such a notification program, the identification information of the site providing device $30_1$ or the site providing device $30_2$ is included.

Hereinafter, as an example of data processing performed by the advertising device 100 according to an embodiment, the process of storing the user information that is transmitted from the user terminal 10 to the advertising device 100 will be described. As illustrated in FIG. 1A, in order to acquire a web page configuring the web site provided by the site providing device $30_1$, the user terminal 10 accesses the site providing device $30_1$ that is an information providing device in Step S1. The user terminal 10 and the site providing device $30_1$ are communicably interconnected in a wired or wireless manner.

In addition, in order to acquire a web page provided by the site providing device $30_2$, the user terminal 10 accesses the site providing device $30_2$ in Step S2. Hereinafter, in a case where the site providing device $30_1$ and the site providing device $30_2$ do not need to be discriminated from each other, these may be collectively denoted by "site providing device 30".

Here, the user terminal 10 transmits the user information of the user terminal 10 that includes information indicating an access to the site providing device $30_1$ to the advertising device 100 by being triggered upon the access to the site providing device $30_1$ in Step S3. Similarly, the user terminal 10 transmits the user information of the user terminal 10 that includes information indicating an access to the site providing device $30_2$ to the advertising device 100 by being triggered upon the access to the site providing device $30_2$ in Step S4.

In other words, the user terminal 10 acquires a web page from the site providing device $30_1$ or the site providing device $30_2$ and transmits the user information to the advertising device 100. Then, the advertising device 100 receives the user information that is transmitted from the user terminal 10.

Then, the advertising device 100 receives the user information transmitted from the user terminal 10 and sequentially stores the user information in the first memory unit 121. For example, the advertising device 100 includes a user information file F01 that is a data file used for storing the user information inside the first memory unit 121 and accumulates the user information in the user information file F01. The user information file F01 is configured by a log acquired when the user terminal 10 accesses the site providing device $30_1$ or the site providing device $30_2$. In the log acquired when an access to the site providing device $30_1$ or the site providing device $30_2$ is made, a user ID used for identifying the user terminal 10, the date and time when the access to the site providing device $30_1$ or the site providing device $30_2$ is made, and the identification information of the site providing device $30_1$ or the site providing device $30_2$ are included.

In FIG. 1A, the user ID of the user terminal 10 is denoted by "UserID=U1". The represents that the user terminal 10 is identified by the user ID "U1". In addition, the identification information of the site providing device $30_1$ or the site providing device $30_2$ is denoted by "key". A key CL01 represents user information that is transmitted through the site providing device $30_1$, and a key CL02 represents user information that is transmitted through the site providing device $30_2$.

Subsequently, the advertising device 100 classifies the user information file F01 based on the key. In other words, the advertising device 100 extracts the user information including the key CL01 and generates a user information file F11 based on the extracted user information. In addition, the advertising device 100 extracts the user information including the key CL02 and generates a user information file F12 based on the extracted user information. Then, the advertising device 100 stores the user information file F11 and the user information file F12 in mutually-different areas included in the second memory unit 122.

More specifically, the advertising device 100 stores the user information file F11 in a first management area 122a inside the second memory unit 122 in Step S5. In addition, the advertising device 100 stores the user information file F12 in a second management area 122b inside the second memory unit 122 in Step S6. In other words, the advertising device 100 stores the user information transmitted from the user terminal 10 for each of the site providing device $30_1$ or the site providing device $30_2$ through which the user information has passed and manages the stored user information.

In this way, the advertising device 100 includes a first memory unit 121 that receives the user information relating to the user using the user terminal 10 by being triggered upon an access of the user terminal 10 to the site providing device $30_1$ or the site providing device $30_2$ and stores the received user information. In addition, the advertising device 100 stores the user information in a different area of the second memory unit 122 for each of the site providing device $30_1$ or the site providing device $30_2$ that is the trigger for reception of the user information that is stored in the first memory unit 121.

In this way, the advertising device 100 according to the embodiment stores the user information of which the amount of information is huge such that the user information can be used for an advertisement delivery for each of the site providing device $30_1$ or the site providing device $30_2$ through which the user information has passed. As a result, the advertising device 100 can respond to the request of each advertiser desiring the advertisement delivery in a flexible manner. More specifically, the advertising device 100, for the user of the user information relating to the advertisement delivery, can classify the user information that can be used for each site providing device 30 or analyze the behavior of visited users for each web site. In addition, for the advertiser, there is an advantage in the management of the user information. For example, the advertiser can request the advertising device 100 to delete the information relating to the user information for each site providing device 30. In this way, the advertising device 100 can handle the data relating to personal information such as the user information as is desired by the advertiser. As above, the advertising device 100 can contribute to the advertising activity of the advertiser by managing the user information in a flexible manner.

1-2. Data Processing (2)

Next, an overview of the data processing according to the embodiment will be described with reference to FIG. 1B. FIG. 1B is a diagram that illustrates an overview of the data processing according to the embodiment. FIG. 1B illustrates an example of a user extracting process relating to an advertisement delivery that is performed by the advertising device 100.

Here, the advertising device 100, as described above, receives the user information and maintains the received user information. Then, the advertising device 100 delivers an advertisement based on the maintained user information. However, the amount of information of the user information is large since unnecessary data is included therein, and accordingly, a considerable time is required for the data processing of the user information. Thus, the advertising device 100 performs data processing to be described below, whereby the data processing of the user information is performed at high speed, and an advertiser is enabled to efficiently utilize the user information.

Hereinafter, as an example of the data processing performed by the advertising device 100 according to an embodiment, a decomposed user information generating process and a user extraction process that is based on a request from a user using the user information will be sequentially described. In addition, as the user information that is the processing target, the user information file F11 stored in the first management area 122a that is included in the second memory unit 122, which is illustrated in FIG. 1A, will be used as a specific example.

First, the decomposed user information generating process using the advertising device 100 will be described. In the example illustrated in FIG. 1B, the advertising device 100 maintains a user information file F11 as user information that is a processing target. Here, the user information file F11 is a data file that is configured by a plurality of access logs $L11_1$, $L11_2$, $L11_3$, . . . , $L11_n$ (here, n is an arbitrary number) that represent user information including user behavior histories. Hereinafter, in a case where the access logs $L11_1$, $L11_2$, $L11_3$, . . . , $L11_n$ do not need to be discriminated from one another, these may be collectively denoted by "access log L11".

Here, the access log $L11_1$ includes the behavior history of a user terminal $10_1$ that is operated by a user whose user ID that is identification information used for identifying a user is "U1". More specifically, the access log $L11_1$ is text data including a search that is performed by inputting a search query "Q001" at the date and time of "1:00 Jan. 10, 2014" at a web site at which the user terminal 101 is specified by a uniform resource locator (URL) of "H001". The elements configuring the access log $L11_1$ will be described later in detail. Here, it is assumed that the user terminal $10_1$ is operated by the user whose user ID is "U1", and a user terminal $10_2$ is operated by a user whose user ID is "U2". In a case where the user terminals $10_1$, $10_2$, . . . do not need to be discriminated from one another, these may be collectively denoted by a "user terminal 10".

The advertising device 100 newly generates a user behavior information file $F21_1$ based on the user information file F11 in Step S1. In the example illustrated in FIG. 1B, the advertising device 100 decomposes the user information file F11 into information in which a behavior history (here, a search history at the web site) performed by the user terminal 10 and a user ID are associated with each other and newly generates the user behavior information file $F21_1$ based on the decomposed information. Here, text data representing each user behavior information that configures the user behavior information file $F21_1$ will be denoted by user behavior data $AC21_1$, $AC21_2$, . . . , $AC21_m$ (here, m is an arbitrary number). In addition, while not illustrated in FIG. 1B, the advertising device 100 may generate a user behavior information file $F21_2$ by decomposing the user information file F11 into information in which a behavior history other than the search and a user ID are associated with each other. For example, the user behavior information file $F21_2$ is configured by information in which a URL representing an access history for a web site and a user ID are associated with each other. In addition, the advertising device 100 may further generate the other user behavior information files $F21_3$, $F21_4$, . . . decomposed for each behavior type by using the user information file F11.

In this way, the "decomposition" described here represents extracting a user ID and a behavior history from the user information including unnecessary information so as to be decomposed into information configured by only a user ID and a behavior history. Here, the information configured by only a user ID and a behavior history may be denoted by "user behavior information".

In other words, the user behavior information file $F21_1$ is a data file that is configured by the user information acquired by decomposing the access log L11 into only items of a user ID that is user identification information and a search history performed by the user. For example, user behavior data $AC21_1$ generated by decomposing an access log $L11_1$ is configured by only data representing that a user identified by a user ID "U1" performs a search by inputting a search query "Q001" at "1:00 on Jan. 10, 2014" (in other words, a search history).

Through the generation process described above, the advertising device 100 acquires the user behavior information file F21₁ of which the amount of information is less than that of the user information file F11.

Subsequently, a user extracting process that is performed by the advertising device 100 based on a request from a user using the user information (for example, an advertiser) will be described. The advertising device 100 receives a request for extracting users showing interest in a specific product based on the user information from an advertiser who desires an advertisement delivery having a high targeting effect. Accordingly, the advertising device 100 extracts users satisfying the received request by using the generated user behavior information file F21. This process will be described as below. Here, a specific example will be described in which a maker M1 that is an advertiser desires an advertisement delivery to users who are interested in the products of the company.

First, the advertising device 100 classifies search queries Q001 to Q004 included in the user behavior information file F21 according to category. For example, it is assumed that the search queries Q001 to Q004 are product names and are manufactured by makers M1 to M3 that are manufactures thereof. Among these, products of product names Q001 and Q004 are manufactured by the maker M1. Similarly, a product of the product name Q002 is manufactured by the maker M2. Similarly, a product of the product name Q003 is manufactured by the maker M3. In this case, the advertising device 100 extracts user's search histories for each of the makers M1 to M3 corresponding to the search queries Q001 to Q004 included in the user behavior information file F21. Then, the advertising device 100 generates a category classification file F31 in which the search queries Q001 to Q004 are classified according to category in Step S12. In addition, the advertising device 100 appropriately refers to a product database and the like for the classification of the categories. Such a database may be arranged inside the advertising device 100 or may be arranged outside the advertising device 100 and be connected through a network.

The category classification file F31 is a data file that is configured by a user ID and a user's search history. More specifically, the user behavior information file F21 represents that a user identified by the user ID "U1" performs a search of inputting the search query "Q001" three times and performs a search of inputting the search query "Q002" once. This represents that, for the user identified by the user ID "U1", there are three search histories of the search query "Q001" corresponding to the maker M1 and one search history of the search query "Q002" corresponding to the maker M2. In this case, the advertising device 100 extracts the user ID "U1", the number of search histories for the maker M1, and the number of search histories for the maker M2 from the user behavior information file F21. Similarly, the advertising device 100 extracts the user ID and the behavior history also for each of the user identified by the user ID "U2" and the user identified by the user ID "U3".

Then, the advertising device 100 generates the category classification file F31 based on the information relating to the user ID and the behavior history that have been extracted. More specifically, the advertising device 100 generates the category classification file F31 that is a data file representing the user ID "U1", the number (in FIG. 1B, represented as "M1_cnt=3") of search histories performed by the user whose user ID is "U1" for the maker M1, and the number (in FIG. 1B, represented as "M2_cnt=1") of search histories for the maker M2.

In addition, the advertising device 100 sets a new item in the user information by using the category classification file F31, thereby responding to a request from the advertiser. For example, in a case where the user's behavior history satisfies a predetermined condition, the advertising device 100 sets a corresponding predetermined item. In FIG. 1B, as a specific example, in a case where the user's search history is extracted three or more times for each category, the advertising device 100 determines that the user is interested in the makers M1 to M3 relating to the category and sets an item "interested".

For the set item "interested", the advertising device 100 extracts corresponding users from the category classification file F31. More specifically, the advertising device 100 refers to the behavior history for each category represented in the category classification file F31 and extracts users each having three or more behavior histories. Then, for each extracted user, the advertising device 100 determines whether or not each extracted user corresponds to the item "interested" for the makers M1 to M3 relating to the category. In addition, the advertising device 100 counts the number of users corresponding to the item and shows-a result of the counting. Then, the advertising device 100 generates an item data file F41 based on the extracted information for the set item in Step S13.

In other words, the advertising device 100 generates the category classification file F31 and the item data file F41 in response to a request from the advertiser. In addition, the advertising device 100 presents information relating to the category classification file F31 and the item data file F41, which have been generated in response to a request from an advertiser, to the advertiser.

For example, the advertising device 100 presents information represented in the category classification file F31 and the item data file F41 to the maker M1 that is the advertiser. In other words, based on the search histories of three users for a predetermined period, the advertising device 100 presents information including that two out of the three users are interested in the product of the maker M1, and one out of the three user is interested in the product of the maker M3 to the maker M1 that is the advertiser.

Thereafter, the advertising device 100 receives a request relating to an advertisement delivery from the maker M1 that is the advertiser. For example, the advertising device 100 receives a request indicating that an advertisement delivery to users determined to be interested in the maker M1 is desired from the maker M1 that is the advertiser.

When the request is received, the advertising device 100 generates a user list file F51 based on the item data file F41 in Step S14. In other words, the advertising device 100 extracts users to which an advertisement is actually delivered by the maker M1 that is the advertiser and generates the user list file F51 that is a data file used for specifying the extracted users. Then, the advertising device 100 performs a process of delivering an advertisement corresponding to the maker M1 that is the advertiser based on the generated user list file F51.

In this way, the advertising device 100 according to the embodiment acquires the user information including the user's behavior histories and decomposes the acquired user information including unnecessary information, thereby generating user behavior information data of which the amount of information is relatively small. Accordingly, the advertising device 100 can shorten a time that is required for data processing relating to the advertisement delivery performed thereafter. As a result, since desired user information can be presented to the advertiser in a speedy manner, the advertising device 100 can appropriately respond to a request from the advertiser. In addition, the advertiser can acquire desired information in a short time, it is easy for the advertiser to use the user information for the delivery of advertisements. In other words, through the process described above, the advertising device 100 can efficiently use the user information for the delivery of advertisements.

2. Configuration of Data Processing System

Figure 2:
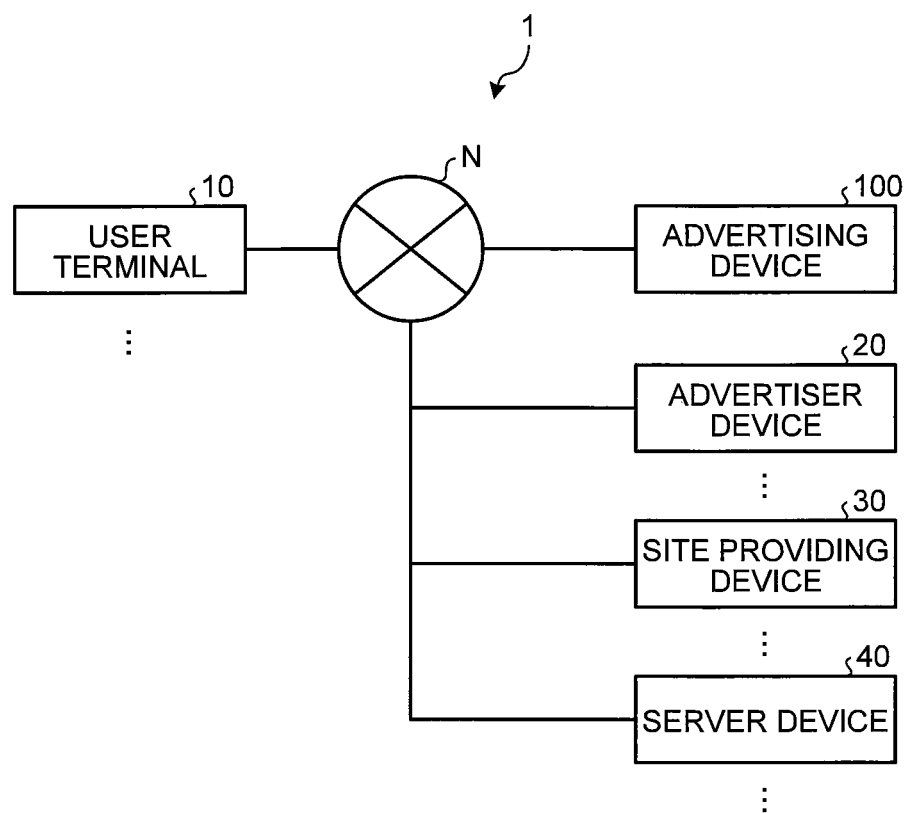
FIG. 2 is a diagram that illustrates an example of the configuration of a data processing system according to an embodiment.

Next, the configuration of a data processing system that includes the advertising device 100 according to the embodiment will be described with reference to FIG. 2. FIG. 2 is a diagram that illustrates an example of the configuration of a data processing system 1 according to an embodiment. As illustrated in FIG. 2, the data processing system 1 includes: a user terminal 10; an advertiser device 20; a site providing device 30; a server device 40; and the advertising device 100. Such various devices are communicably interconnected through a network N in a wired or wireless manner. In addition, the data processing system 1 illustrated in FIG. 2 may include a plurality of the user terminals 10, a plurality of the advertiser devices 20, a plurality of the site providing devices 30, or a plurality of the server devices 40.

The user terminal 10, for example, is an information processing device such as a desktop personal computer (PC), a notebook PC, a tablet-type terminal, a portable telephone, or a personal digital assistant (PDA). For example, the user terminal 10 acquires a web page from a web site provided by the site providing device 30 by accessing the site providing device 30 and displays the acquired web page on a display device (for example, a liquid crystal display).

The advertiser device 20 is an information processing device that is used by an advertiser requesting the advertising device 100 to deliver an advertisement. The advertiser device 20 requests the advertising device 100 to provide the user information or deliver an advertisement in accordance with an advertiser's operation.

In addition, the advertiser, by using the advertiser device 20, instead of requesting the advertising device 100 to provide the user information or deliver an advertisement, may make such a request from an agent. In such a case, the agent makes such as request from the advertising device 100. Hereinafter, a notation of an "advertiser" has a concept including not only an advertiser but also an agent, and a notation of an "advertiser device" has a concept including not only an advertiser device but also an agent device used by an agent.

The site providing device 30 is an web server that provides various web pages when being accessed from the user terminal 10. The site providing device 30, for example, provides various web pages relating to a news site, an auction site, a weather forecast site, a shopping site, a finance (stock price) site, a route search site, a map providing site, a travel site, a restaurant introduction site, a web blog, and the like.

As described above, in a web page provided by the site providing device 30, a notification function relating to an access log L11 or the like realized by a web beacon or the like may be embedded. Accordingly, the advertising device 100 can acquire the user information such as the access log L11 from the user terminal 10 through the site providing device 30. In the information acquired by the advertising device 100 from the user terminal 10 in accordance with the web beacon that is such a notification program, the identification information of the site providing device 30 and the like are included.

The server device 40, similar to the site providing device 30, is a web server that provides various web pages when being accessed from the user terminal 10. In addition, a web page delivered by the server device 40 includes an advertisement space used for displaying an advertising content. Furthermore, the web page delivered by the server device 40 includes an advertisement acquisition command used for acquiring an advertising content to be displayed in the advertisement space. For example, in a hypertext markup language (HTML) file or the like forming a web page, the URL of the advertising device 100 and the like are described as an advertisement acquisition command. In such a case, the user terminal 10 accesses the URL described in the HTML file or the like, thereby acquiring an advertising content from the advertising device 100.

The advertising device 100 is an information processing device that provides the user information for the advertiser device 20. As described above, the advertising device 100 receives a request from the advertiser device 20 and provides the user information for the advertiser device 20. In addition, the advertising device 100 delivers an advertising content to the user terminal 10 in accordance with a request from the advertiser device 20 using the provided user information.

In addition, the advertising device 100 delivers an advertising content, identifies the user terminal 10, and specifies the user terminal 10 to which the advertising content is delivered. Here, the identification of the user, for example, can be performed by including user identification information in a hypertext transfer protocol cookie (HTTP cookie; hereinafter, simply referred to as only a "cookie") that is exchanged between the browser of the user terminal 10 and the advertising device 100. In addition, in a case where a plurality of browsers are installed to the user terminal 10, a plurality of "user IDs" may be assigned to one user terminal 10, here, for easy understanding of the description, it is assumed that one browser is installed to the user terminal 10. In addition, the technique for identifying the user is not limited thereto. For example, it may be configured such that a dedicated program is set in the user terminal 10, and the user identification information is transmitted from the dedicated program to the advertising device 100.

3. Configuration of Advertising Device 100

Figure 3:
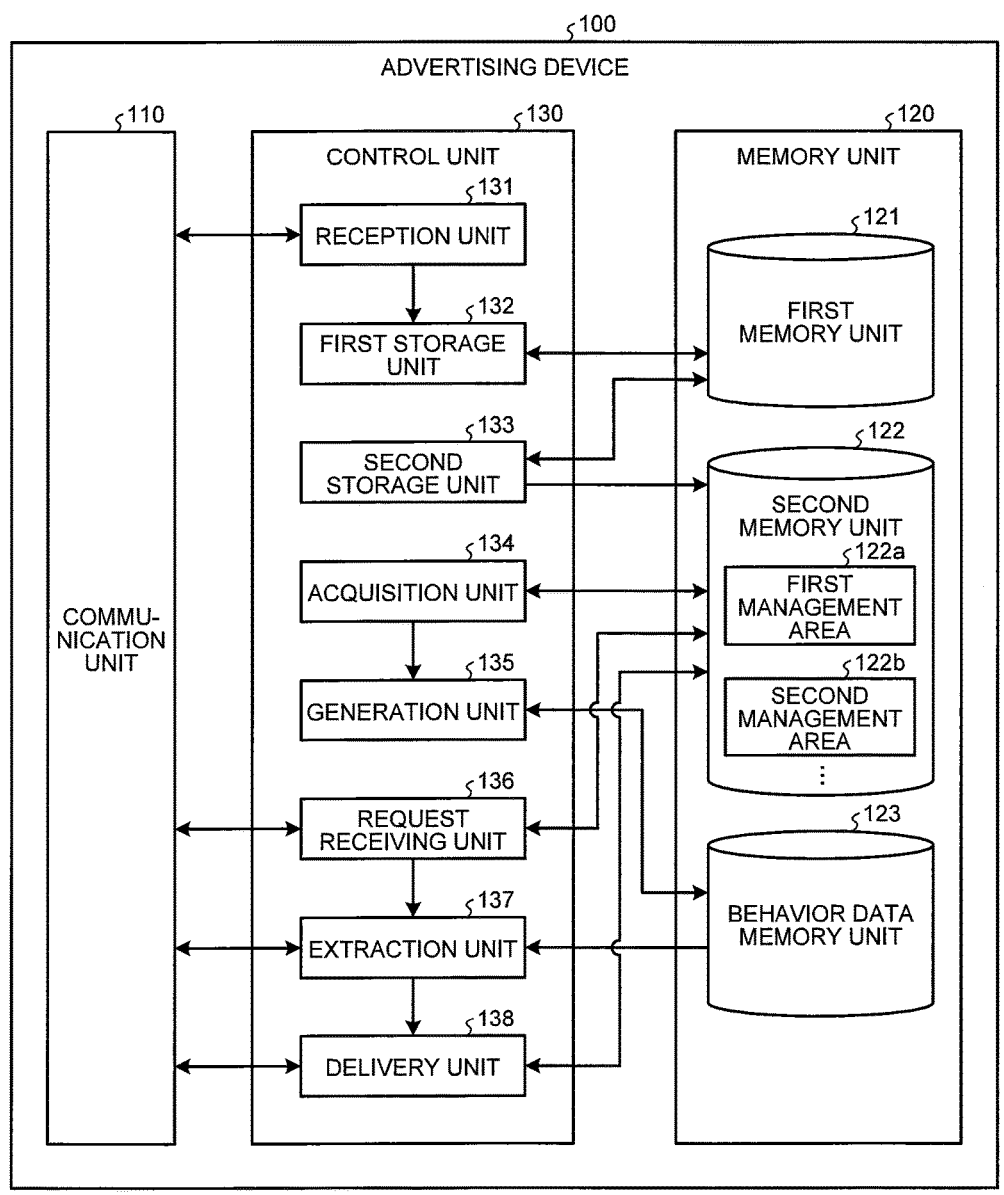
FIG. 3 is a diagram that illustrates an example of the configuration of an advertising device according to an embodiment.

Next, the advertising device 100 according to the embodiment will be described with reference to FIG. 3. FIG. 3 is a diagram that illustrates an example of the configuration of the advertising device 100 according to the embodiment. As illustrated in FIG. 3, the advertising device 100 includes a communication unit 110, a memory unit 120, and a control unit 130. In addition, the advertising device 100 may be configured to include an input unit (for example, a keyboard, a mouse, or the like) that receives various operations from a supervisor using the advertising device 100 and a display unit (for example, a liquid crystal display or the like) that is used for displaying various kinds of information.

3-1. Communication Unit

The communication unit 110, for example, is realized by a network interface card (NIC) or the like. Such a communication unit 110 is connected to the network N in a wired or wireless manner and transmits/receives information among the user terminal 10, the advertiser device 20, and the site providing device 30 through the network N.

3-2. Memory Unit

The memory unit 120, for example, is realized by a semiconductor memory device such as a random access memory (RAM) or a flash memory or a storage device such as a hard disk or an optical disc. The memory unit 120 includes a first memory unit 121, a second memory unit 122, and a behavior data memory unit 123.

3-3. First Memory Unit

The first memory unit 121 stores the user information that is acquired by the advertising device 100. More specifically, the first memory unit 121 stores user information relating to the user terminal 10 that is received by a reception unit 131 to be described later as a trigger for the user terminal 10 to access the site providing device 30.

Figure 4:
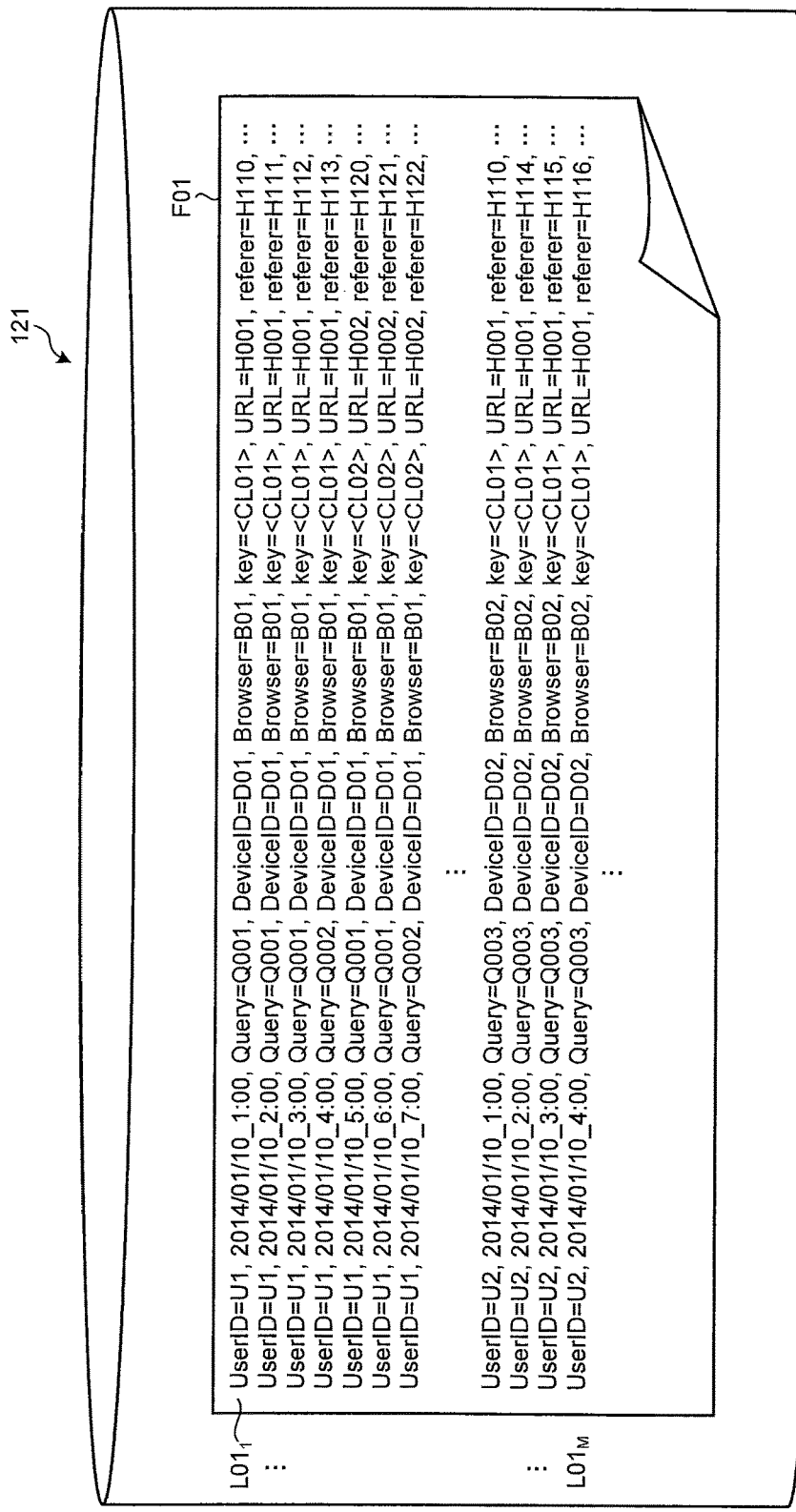
FIG. 4 is a diagram that illustrates an example of a first memory unit according to an embodiment.

Here, FIG. 4 illustrates an example of the first memory unit 121 according to the embodiment. FIG. 4 is a diagram that illustrates an example of the first memory unit 121 according to the embodiment. In the example illustrated in FIG. 4, the first memory unit 121 stores a user information file F01 that is configured by access logs $L01_1$ to $L01_M$ (here, M is an arbitrary number) having items of a "user ID", a "query", a "device ID", a "browser", a key, a "URL", and a "referrer".

The "user ID" is user identification information used for identifying the user terminal 10. Here, the identification of the user, for example, can be performed by including user identification information in a cookie that is exchanged between the user terminal 10 and the advertising device 100. In addition, in a case where a plurality of browsers are installed to the user terminal 10, while a plurality of "user IDs" may be assigned to one user terminal 10, here, for easy understanding of the description, it is assumed that one browser is installed to the user terminal 10. In addition, the technique for identifying the user is not limited thereto. For example, it may be configured such that a dedicated program is set in the user terminal 10, and the user identification information is transmitted from the dedicated program to the advertising device 100.

In the "query", a search request is represented by a character string. Here, the query represents a character string that is input when a search is performed by the user terminal 10. For example, an arbitrary product name or the like used for a search corresponds thereto. As illustrated in FIG. 4, when a search is performed by the user terminal $10_1$, a character string "Q001" that is used for the search and the date and time of the search are recorded as items of the access log $L01_1$.

The "device ID" is information used for identifying the user terminal 10. The device ID, differently from the user ID, represents the identification information that is recorded in the device. The "browser" is software used for displaying information in a terminal device or the like so as to be provided for reading. Here, the browser represents a web browser that is used by the user terminal 10 for displaying a web page.

The "key" is information that is used for identifying the site providing device 30 that is accessed by the user terminal 10. As described above, in a case where the user terminal 10 accesses a web site provided by the site providing device 30, the advertising device 100 acquires the user information of the user terminal 10 using a notification function of a web beacon or the like embedded in a web page provided by the site providing device 30. At this time, through the notification function of the web beacon or the like, the information of the web site is assigned to the user information as a key.

For example, the key is the name of a supervisor managing the site providing device 30. The key may be used as an index in a data storage system or a data management system using a key value store (KVS) or the like. In other words, to user information to be stored, a key used for discriminating the user information from other user information is assigned, and the user information is accumulated by being stored in the first memory unit 121, and accordingly, the advertising device 100 can extract corresponding user information by using the key set in advance as an index. In addition, from this, the advertising device 100 can specify the site providing device 30 used by the user terminal 10. As illustrated in FIG. 4, when a search is performed by the user terminal $10_1$, "CL01" representing the supervisor of the site providing device $30_1$ that provides a web site for which the search is performed is assigned as a key.

The "referrer" is address information of a link source page when a movement from a link of a predetermined web page to another page is made.

In other words, the access log $L01_1$ configuring the user information file F01 illustrated in FIG. 4 represents that a user terminal $10_1$ operated by a user whose user ID is "U1" accessed a web site that is provided by a site providing device $30_1$ that is identified by a key "CL01". In addition, the access log $L01_1$ represents that the user terminal $10_1$ is identified by a device ID "D01" and read a web page using a browser "B01". Furthermore, the access log $L01_1$ represents that the user terminal $10_1$ performs a search by inputting a query "Q001" in a web page at "1:00 on Jan. 10, 2014".

In addition, here, as the user information stored by the first memory unit 121 according to the embodiment, as illustrated in FIG. 4, an example is illustrated in which a search history is included as a user's behavior history. However, there may be a case where the first memory unit 121, instead of "Query" that is a behavior history included in the access log L01, stores, for example, an access log $L01_x$ (here, X is an arbitrary number) according to "buy" representing a purchase, "Click Link" representing a click on a banner advertisement, or the like.

3-4. Second Memory Unit

The second memory unit 122 stores the user information in a management area different for each site providing device 30 based on the information used for identifying the site providing device 30 that is included in the user information acquired by the advertising device 100. In other words, the second memory unit 122 stores each user information that is classified based on the item of the key included in the user information in a different management area.

Figure 5:
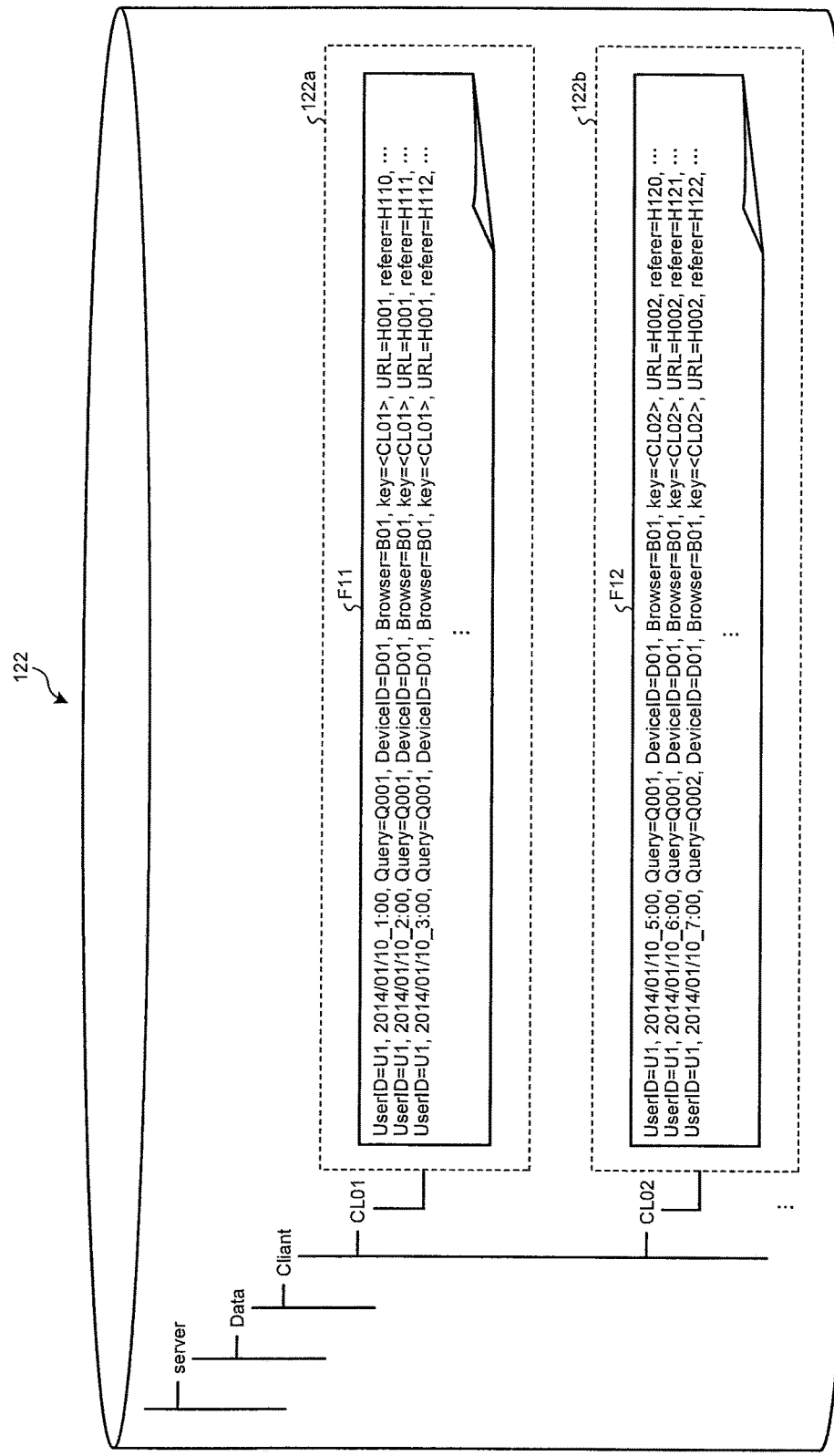
FIG. 5 is a diagram that illustrates an example of a second memory unit according to an embodiment.

Here, an example of the second memory unit 122 will be described with reference to FIG. 5. FIG. 5 is a diagram that illustrates an example of the second memory unit 122 according to the embodiment. As illustrated in FIG. 5, a user information file F11 and a user information file F12 are stored in the second memory unit 122. Here, the user information file F11 and the user information file F12 are data file groups acquired by classifying the user-information file F01 based on the item of the key.

More specifically, the user information file F11 is configured by data, of which the item of the key is "CL01", included in the user information file F01. In other words, the user information file F11 illustrated in FIG. 5 corresponds to the user information file F11 illustrated in FIG. 1B. In addition, the user information file F12 is configured by data, of which the item of the key is "CL02", included in the user information file F01. While not illustrated in FIG. 5, the second memory unit 122 may further store a data file that is acquired by classifying the user information file F01 based on the item of the key.

The second memory unit 122 stores the user information file F11 and the user information file F12 in mutually-different areas. In other words, the second memory unit 122 stores the user information file F11 in a first management area 122a and stores the user information file F12 in a second management area 122b. FIG. 5 illustrates an example in which the user information file F11 and the user information file F12 are stored in hierarchies (directories) as the mutually-different management areas. In other words, the second memory unit 122 stores the user information file F11 under "/server/Data/Client/CL01". In addition, the second memory unit 122 stores the user information file F12 under "/server/Data/Client/CL02" that is a hierarchy different from that of the user information file F11.

Here, while a form has been described in which the first management area 122a and the second management area 122b are divided according to the hierarchy, an actual storage technique is not limited thereto. For example, instead of being divided into the first management area 122a and the second management area 122b in accordance with the hierarchy, the second memory unit 122 may store the user information in physically-different management areas by using storage media that are different from each other. While not illustrated in FIGS. 3 and 5, the second memory unit 122 is not limited to the first management area 122a and the second management area 122b but may include more management areas.

In addition, the second memory unit 122 may not be present inside the advertising device 100 but, for example, may be a storage server that is connected to the outside of the advertising device or the like. In such a case, the second storage unit 133 to be described later stores the user information in a storage server corresponding to the second memory unit 122 through a network. In addition, in this case, the advertising device 100 can additionally install the capacity of the memory device corresponding to the second memory unit 122 in an easy manner. In other words, since the advertising device 100 receives the user information at all times, a storage capacity of a large amount for storing the data relating to the user information is necessary. Here, for example, by increasing the number of external memory devices corresponding to the second memory unit, the advertising device 100 can realize the necessary memory capacity in an easy manner.

The first memory unit 121 may be managed during a period different from that of the second memory unit 122 as a period until the user information is deleted after being stored. In other words, the advertising device 100 may set the storage period of the user information stored in the first memory unit 121 and the storage period of the user information classified based on the information used for identifying the site providing device 30 that is stored in the second memory unit 122 as mutually-different periods. Accordingly, the advertising device 100, for example, may store the user information in the first memory unit 121 and delete only the corresponding user information stored in the second memory unit 122. In addition, the advertising device 100 may use the first memory unit 121 as a memory device that temporarily stores the user information. In such a case, the first memory unit 121, for the data relating to the user information, manages such data to be stored only for a predetermined period after being stored in the second memory unit 122. In this way, the advertising device 100, for the data relating to the user information that is accumulated in the first memory unit 121 at all times, can separate and delete a predetermined period. Accordingly, the advertising device 100 can process the user information without excessively additionally install the memory capacity of the first memory unit 121.

3-5. Behavior Data Memory Unit

The behavior data memory unit 123 stores user behavior information that is acquired by decomposing the user information acquired by the advertising device 100 for each behavior type. More specifically, the behavior data memory unit 123 decomposes the user information file F11 into information in which a behavior history of behaviors performed by the user terminal 10 and the user ID are associated with each other, thereby storing user behavior information file F21 and user behavior information file F22 that are newly generated.

Figure 6:
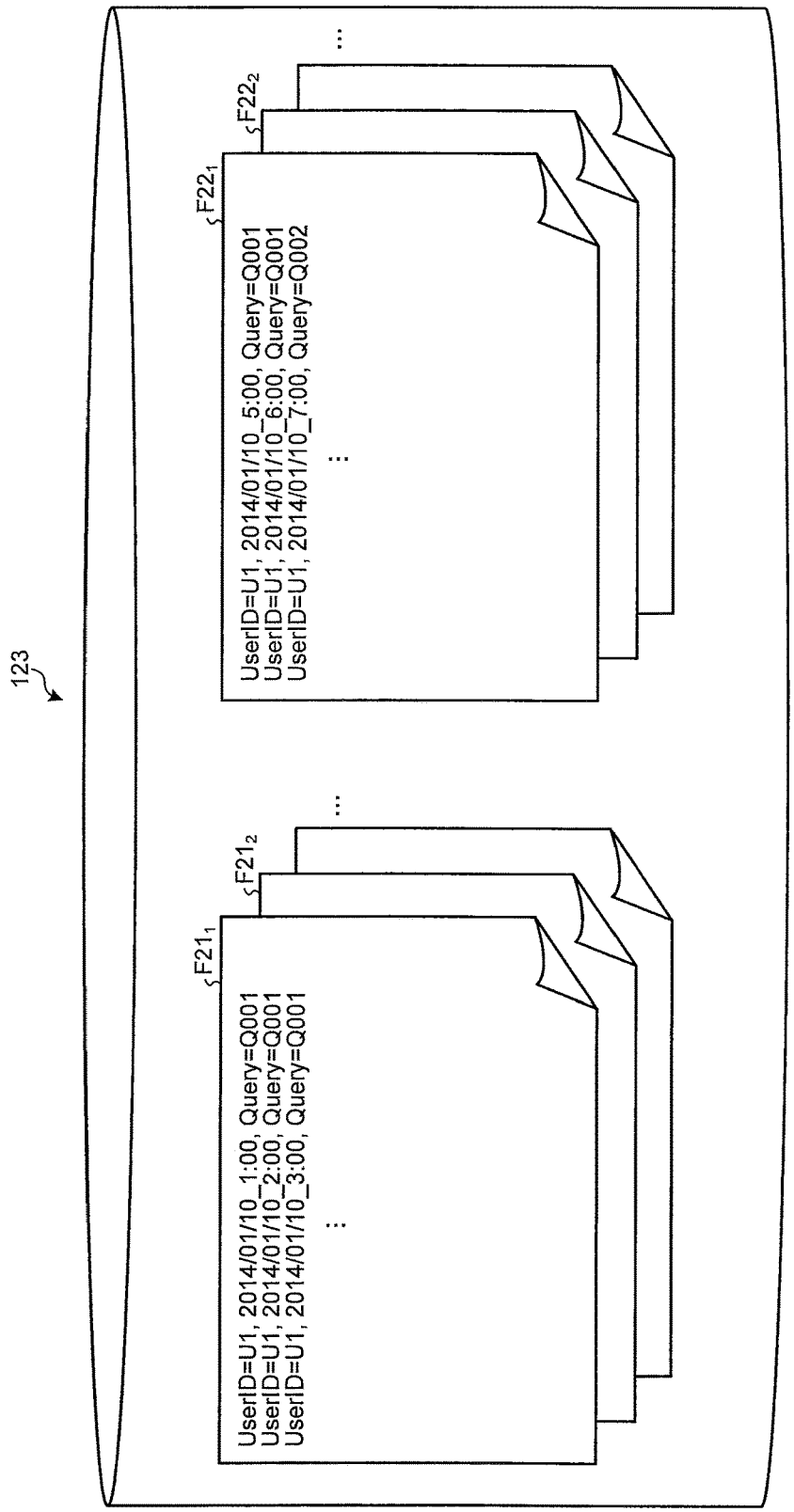
FIG. 6 is a diagram that illustrates an example of a behavior data memory unit according to an embodiment.

Here, an example of the behavior data memory unit 123 will be described with reference to FIG. 6. FIG. 6 is a diagram that illustrates an example of the behavior data memory unit 123 according to the embodiment. As illustrated in FIG. 6, in the behavior data memory unit 123, user behavior information files $F21_1$, $F21_2$, . . . are stored. In addition, in the behavior data memory unit 123, user behavior information files $F22_1$, $F22_2$, . . . are stored. Here, the user behavior information files $F21_1$, $F21_2$, . . . are data file groups acquired by decomposing the user information file F11 for each behavior type. In addition, the user behavior information files $F22_1$, $F22_2$, . . . are data file groups acquired by decomposing the user information file F12 for each behavior type.

For example, the user behavior information file $F21_1$ is a data file that is generated by decomposing the user information file F11 for the user's search history. While not illustrated in FIG. 6, the user behavior information file $F21_2$ is a data file that is generated by decomposing the user information file F11 for another behavior history different from the search history. For example, since data relating to the referrer may be a user's behavior history, there is a case where a user behavior information file $F21_2$ in which the user ID and the information of the referrer are associated with each other is generated. In such a case, the behavior data memory unit 123 stores the generated user behavior information file $F21_2$. Here, the user information file F11 and the user information file F12 are user information classified according to keys different from each other. In other words, the user behavior information file $F21_1$ and the user behavior information file $F22_1$ represent user behavior information classified for each key, in other words, for each site providing device 30.

3-6. Control Unit

Referring back to FIG. 3, the control unit 130 is realized by executing various programs (corresponding to an example of a prediction program) stored in an internal memory device of the advertising device 100 using a RAM used as a work area, for example, by using a central processing unit (CPU) or a micro processing unit (MPU). In addition, the control unit 130, for example, is realized by an integrated circuit such as an application specific integrated circuit (ASIC) or a field programmable gate array (FPGA).

As illustrated in FIG. 3, the control unit 130 includes: a reception unit 131; a first storage unit 132; a second storage unit 133; an acquisition unit 134; a generation unit 135; a request receiving unit 136; an extraction unit 137; and a delivery unit 138 and realizes or executes the functions and the actions of information processing described below. In addition, the internal configuration of the control unit 130 is not limited to the configuration illustrated in FIG. 3, but any other configuration may be employed as long as it performs the information processing to be described later. Furthermore, the connection relation of each processing unit included in the control unit 130 is not limited to a connection relation illustrated in FIG. 3, but any other connection relation may be formed.

3-7. Reception Unit

By being triggered upon an access from the user terminal 10 to the information providing device, the reception unit 131 receives user information relating to a user who uses the user terminal 10. More specifically, by being triggered upon an access from the user terminal 10 to a web site provided by the site providing device 30 that is an information providing device, the reception unit 131 according to the embodiment receives an access log L01 that is the user information transmitted from the user terminal 10. The transmission of the user information from the user terminal 10, as described above, is performed through a notification function such as a web beacon. In this case, the reception unit 131 receives the access log L01 to which a key that is identification information used for identifying the site providing device 30 is assigned.

In the description presented above, while information of an access from the user terminal 10 to a web page provided by the site providing device 30 or information that is based thereon is set as the user information, the user information is not limited thereto. For example, a user ID is included in the access log L01. As described above, the identification according to the user ID, for example, is realized by using a cookie or the like. In this case, the reception unit 131 may receive information relating to user attributes included in the user identification information such as a cookie based on the user ID as the user information. In other words, the reception unit 131 tracks users past access information and the like included in the cookie based on the user ID, thereby collecting the user information. Here, the information relating to user attributes represents various kinds of information relating to the user. More specifically, the information relating to user attributes includes information such as user's age, sex, interest, behavior history, and residence area.

As described above, while information that is useful in the data processing performed by the advertising device 100 is included in the user information received by the reception unit 131, information such as the device ID and OS information of the user terminal 10 that are not necessary for the data processing is also included in the user information, and accordingly, the user information is data of which the amount of information is large.

3-8. First Storage Unit

The first storage unit 132 stores the user information received by the reception unit 131 in the first memory unit 121. More specifically, the first storage unit 132 according to the embodiment stores the user information according to the access log L01 received by the reception unit 131 in the first memory unit 121. In this case, the first storage unit 132 generates a user information file F01 configured by a plurality of access logs L01 and stores the user information file F01 in the first memory unit 121.

3-9. Second Storage Unit

The second storage unit 133 stores the user information stored in the first memory unit 121 in a management area, which is different for each information providing device that is a trigger for the reception, of the second memory unit 122. More specifically, the second storage unit 133 according to the embodiment, based on the access log L01 to which a key is assigned for each site providing device 30 that is the information providing device, classifies the user information file F01 stored in the first memory unit 121 into a file that is different for each key. Then, the second storage unit 133 stores the user information file F11 and the user information file F12, which are classified for each key, respectively in the first management area 122a and the second management area 122b that are mutually-different management areas arranged inside the second memory unit 122.

In other words, the second storage unit 133, for each site providing device 30 used by the user terminal 10, stores the user information (in other words, the user information to which a key corresponding to the site providing device 30 is assigned) corresponding to the site providing device 30 in the second memory unit 122 as a different file. In addition, as described above, the second memory unit 122 stores data in accordance with a hierarchical structure. Thus, the second storage unit 133 stores the user information to which a corresponding key is assigned for each site providing device 30 by using a management area of a hierarchy different for each site providing device 30.

3-10. Acquisition Unit

The acquisition unit 134 acquires the user information that includes user's behavior histories. More specifically, the acquisition unit 134 according to the embodiment acquires the user information file F11 or the user information file F12 that is stored in the second memory unit 122.

Here, each of the user information file F11 and the user information file F12 includes a user ID that is the user identification information and a plurality of behavior histories corresponding to each predetermined behavior type. Here, as the predetermine behavior types, for example, there are an access to a web page, a search behavior performed by inputting a query, a purchase behavior on a shopping page, and the like. As above, since the acquisition unit 134 acquires user information that includes a user ID and a plurality of behavior histories, the generation unit 135 to be described later can generate the user behavior information file F21 and the user behavior information file F22.

In addition, the acquisition unit 134 acquires the user information file F11 or the user information file F12 that is classified for each site providing device 30. In other words, the user behavior information file F21 or the user behavior information file F22 generated by the generation unit 135 to be described later is generated as a data file including a behavior history classified for each site providing device 30.

3-11. Generation Unit

The generation unit 135 generates the user behavior information that is acquired by decomposing the user information acquired by the acquisition unit 134 for each predetermined behavior type. More specifically, the generation unit 135 according to the embodiment decomposes the user information file F11 acquired by the acquisition unit 134 for each behavior history. Then, the generation unit 135 according to the embodiment generates the user behavior information file F21$_1$ based on the decomposed user behavior information. Similarly, the generation unit 135 generates the user behavior information file F22$_1$ based on the user information file F12 acquired by the acquisition unit 134.

Subsequently, the generation unit 135 stores the user behavior information file F21$_1$ and the user behavior information file F22$_1$, which have been generated, in the behavior data memory unit 123. The user behavior information file F21$_1$ generated by the generation unit 135 includes a user ID and a search history that is a behavior history corresponding to each predetermined behavior type. In addition, the generation unit 135 may generate a user behavior information file F21$_2$ that is configured by a behavior history, which is different from the user behavior information file F21$_1$, based on the user information file F11.

As above, the generation unit 135 generates the user information including only a user ID and behavior histories and stores the generated user information in the behavior data memory unit 123, whereby the extraction unit 137 to be described-later can extract information according to a request from an advertiser.

3-12. Request Receiving Unit

The request receiving unit 136 receives a request relating to the user information from an information user using the user information. More specifically, the request receiving unit 136 according to the embodiment receives a request at the time of using the user information from the advertiser device 20 operated by the advertiser who is the information user using the user information for an advertisement delivery.

The request receiving unit 136 receives a request including a user's behavior history. The designation of the user's behavior history is performed by the advertiser device 20. For example, the request receiving unit 136 receives a request for extracting users having a search history for a product provided by the advertiser for an advertisement delivery having a high advertising effect from the advertiser device 20. In addition, the request receiving unit 136 receives a request for extracting users having a search history for a product provided by another advertiser competing with the advertiser from the advertiser device 20.

In addition, the request receiving unit 136 receives a request for deleting the user information accumulated for each site providing device 30 from the advertiser. In this case, the request receiving unit 136 can delete the user information corresponding to the request by referring to the management area for each site providing device 30 that is arranged inside the second memory unit 122. Accordingly, the deleted data cannot be used for an advertisement delivery, and the request from the advertiser is satisfied. Thereafter, when the user information is to be used again, the second storage unit 133 can restore the user information that has been deleted from the inside of the second memory unit 122 by referring to the key of the user information stored in the first memory unit 121. In addition, in a case where the amount of stored data exceeds a predetermined amount, it may be assumed that the user information is sequentially deleted in the first memory unit 121 and the second memory unit 122. Here, the first memory unit 121 and the second memory unit 122 are individually managed during periods different from each other as periods until the user information is deleted after being stored. Accordingly, the second storage unit 133 can appropriately restore data relating to the user information while the user information that is the target for the restoration is stored in the first memory unit 121 or the second memory unit 122. In addition, the request for deleting the user information as described above may be configured to be received from the supervisor of the site providing device 30.

Furthermore, the request receiving unit 136 also receives a request for actually delivering an advertisement to the extracted users from the advertiser device 20. The reception of the request from the advertiser as described above, for example, is displayed in the advertiser device 20 and is performed through a user interface screen provided by the advertising device 100.

3-13. Extraction Unit

The extraction unit 137 extracts users satisfying a request received by the request receiving unit 136 by using the user behavior information generated by the generation unit 135. More specifically, for the request from the advertiser that is received by the request receiving unit 136, the extraction unit 137 according to the embodiment performs the process of extracting users satisfying the request from the advertiser by referring to the user behavior information file F21 stored in the behavior data memory unit 123 and the like.

Figure 7:
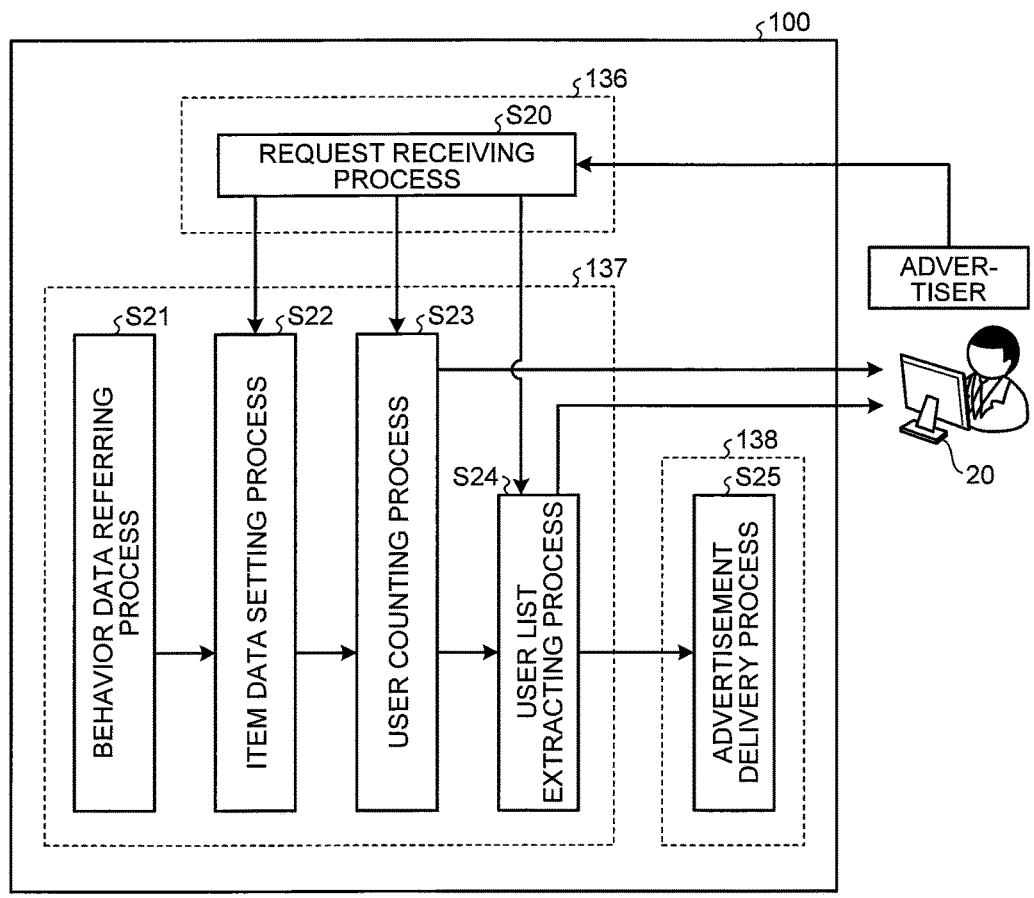
FIG. 7 is a diagram that illustrates an example of an extraction process according to an embodiment.

Here, an example of the extraction process performed by the extraction unit 137 will be described with reference to FIG. 7. FIG. 7 is a diagram that illustrates an example of the extraction process according to the embodiment. As illustrated in FIG. 7, the advertiser device 20 transmits a request for using the user information to the advertising device 100. Then, the request receiving unit 136 included in the advertising device 100 receives a request from the advertiser device 20 in Step S20.

For example, a case will be described in which an advertiser delivers an advertisement to users who are interested in a product or the like provided by the advertiser. While the advertiser device 20 can request the advertising device 100 to deliver an advertisement to user terminals 10, at that time, there are problems in whether users to whom the advertisement is delivered are users interested in a specific product or a specific company and the number of the users to whom the advertisement is delivered. In other words, even when an advertisement is delivered to users who are not interested in products provided by the advertiser, there are cases where the advertisement effect desired by the advertiser cannot be acquired. In addition, a case may be considered in which the cost required for the advertisement delivery varies in accordance with the number of users to whom the advertisement is delivered. Generally, as the number of users to whom the advertisement is delivered is increased, the cost required for the advertisement increases. Accordingly, the advertiser tends to desire the delivery of an advertisement having the highest effect with a limited number of advertisement deliveries.

Thus, first, the advertiser device 20 transmits a request to the advertising device 100 for presenting information relating to the number of users interested in products provided by the advertiser based on the user information. The request receiving unit 136 receives the transmitted request.

Here, the extraction unit 137 refers to the user behavior information file F21 stored in the behavior data memory unit 123 in Step S21. Then, the extraction unit 137 extracts information relating to the search history of the user behavior information file F21 in accordance with the request from the advertiser and generates a category classification file F31 that is classified according to the category. Then, in order to extract the information relating to the number of users who are interested in the products and the like provided by the advertiser, the extraction unit 137 sets an item in Step S22. For example, the extraction unit 137 refers to the category classification file F31 and sets the item of "interested" when a predetermined number of search histories is detected.

Then, for "interested" that is the set item, the extraction unit 137 extracts corresponding users from the category classification file F31 and counts the extracted users in Step S23. In this process, the extraction unit. 137 generates an item data file F41. In this step, the extraction unit 137 extracts the number of users based on the search history but does not generate a user list specifying the users. In other words, since the extraction unit 137 counts users from the data configured by only a user ID and search histories, the extraction process can be performed at high speed. Subsequently, the extraction unit 137 transmits a result of the counting of the users to the advertiser device 20. Then, in a case where the advertiser receives the result of the counting of the users and agrees to the delivery of an advertisement, the advertiser device 20 transmits a request for the delivery of the advertisement for the extracted users to the advertising device 100.

The extraction unit 137 receives a request for the advertisement delivery from the advertiser device 20 and generates a user list file F51 specifying the extracted users in Step S24. Then, the extraction unit 137 allows the delivery unit 138 to be described later to refer to the generated user list file F51 in Step S25.

In addition, the extraction unit 137 stores the category classification file F31 classifying the user behavior information, the item data file F41 including information in which the result of the counting of users satisfying the request from the advertiser device 20, the behavior history, and the user ID are associated with each other, and the user list file F51 specifying the extracted users in the predetermined memory unit 120. For example, the extraction unit 137 stores the above-described files in predetermined hierarchies of the behavior data memory unit 123.

3-14. Delivery Unit

The delivery unit 138 performs the process of delivering an advertisement in accordance with a-request from a user using the user information. More specifically, the delivery unit 138 according to the embodiment performs the process of delivering an advertisement to a specified user terminal 10 based on the user list file F51 generated in accordance with a request from the advertiser. In other words, in a case where an advertisement acquisition command transmitted from the user terminal 10 is received, the delivery unit 138 specifies the user terminal 10 through transmission/reception of a cookie. Then, in a case where the user using the specified user terminal 10 and a user included in the user list file F51 coincide with each other, a corresponding advertisement is delivered to the specified user terminal 10.

The advertising content that is actually delivered does not need to be stored inside the advertising device 100. For example, the delivery unit 138 can also transmit a command for delivering an advertisement to the specified user terminal 10 to an external advertising content delivery-server or the like. In addition, when the user terminal 10 is to be specified, the delivery unit 138 may refer to the user information such as the user identification information stored in the memory unit 120.

4. Sequence of Data Processing

Figure 8:
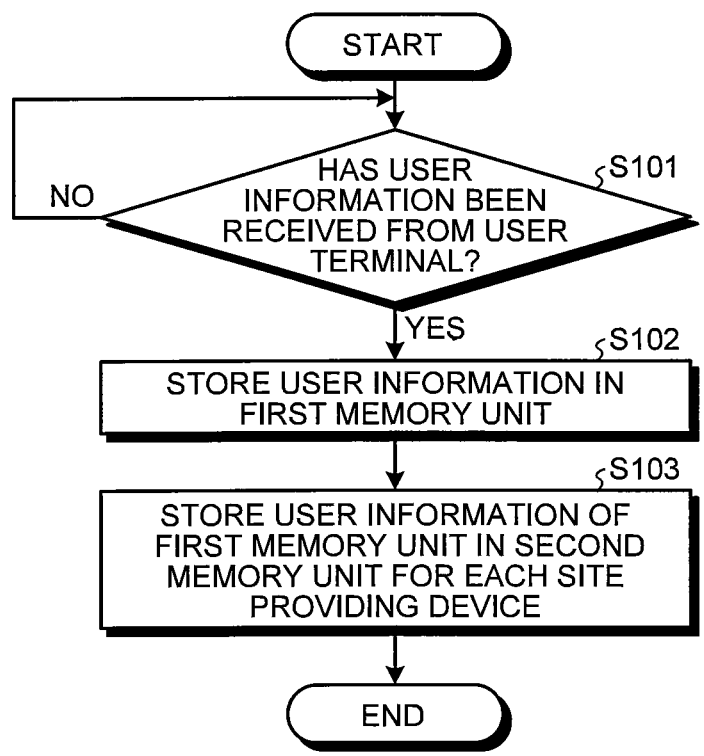
FIG. 8 is a flowchart that illustrates the processing sequence of storing user information that is performed by an advertising device according to an embodiment.
Figure 9:
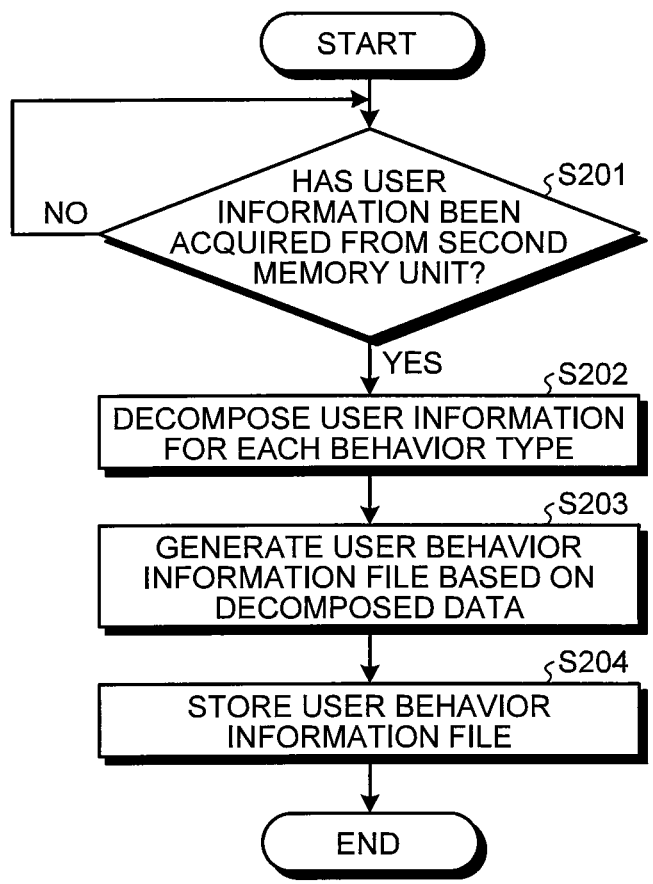
FIG. 9 is a flowchart that illustrates the processing sequence of generating user behavior information that is performed by an advertising device according to an embodiment.
Figure 10:
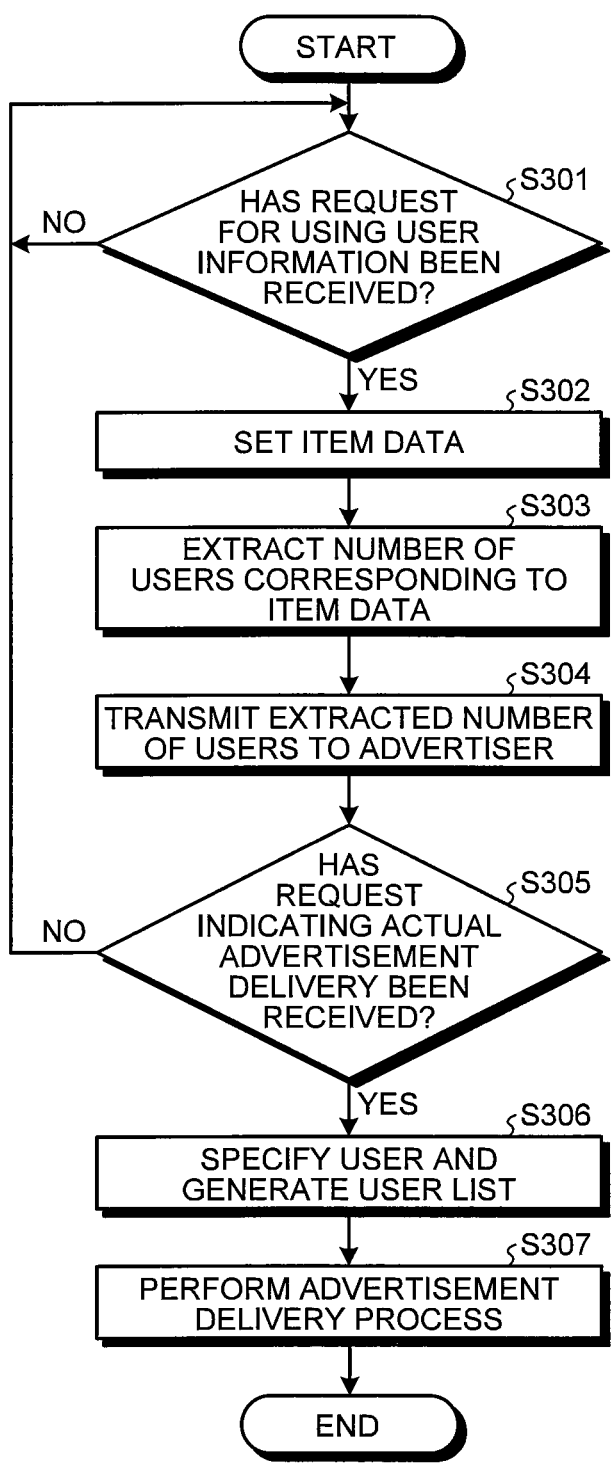
FIG. 10 is a flowchart that illustrates the sequence of the process of extracting users that is performed by an advertising device according to an embodiment.

Next, the sequence of the data processing performed by the advertising device 100 according to the embodiment will be described with reference to FIGS. 8, 9, and 10. FIGS. 8, 9, and 10 are flowcharts that illustrate the sequences of data processing performed by the advertising device 100. Hereinafter, the process of storing the user information that is performed by the advertising device 100 will be described with reference to FIG. 8, the process of generating the user behavior information that is performed by the advertising device 100 will be described with reference to FIG. 9, and the process of extracting users that is performed by the advertising device 100 will be described with reference to FIG. 10.

First, the process of storing the user information that is performed by the advertising device 100 according to the embodiment will be described with reference to FIG. 8. FIG. 8 is a flowchart that illustrates the processing sequence of storing the user information that is performed by the advertising device 100 according to the embodiment.

As illustrated in FIG. 8, the reception unit 131 determines whether or not the user information has been received from the user terminal 10 in Step S101. Then, in a case where the user information has not been received from the user terminal 10 (No in Step S101), the reception unit 131 waits until the user information is received.

On the other hand, in a case where the user information has been received from the user terminal 10 (Yes in Step S101), the reception unit 131 delivers the user information to the first storage unit 132, and the first storage unit 132 stores the user information in the first memory unit 121 in Step S102.

Next, the second storage unit 133 refers to the user information that is stored in the first memory unit 121 and stores the user information in a management area of the inside of the second memory unit 122 that is different for each key identifying the site providing device 30 included in the user information in Step S103. As above, the process of storing the user information that is performed by the advertising device 100 is completed.

Next, the process of generating the user behavior information that is performed by the advertising device 100 according to the embodiment will be described with reference to FIG. 9. FIG. 9 is a flowchart that illustrates the processing sequence of generating the user behavior information that is performed by the advertising device 100 according to the embodiment.

As illustrated in FIG. 9, the acquisition unit 134 determines whether or not the user information has been acquired from the second memory unit 122 in Step S201. Then, in a case where the user information has not been acquired (No in Step S201), the acquisition unit 134 waits until the user information is acquired.

On the other hand, in a case where the user information has been acquired by the acquisition unit 134 (Yes in Step S201), the acquisition unit 134 delivers the acquired user information to the generation unit 135, and the generation unit 135 decomposes the user information for each predetermined behavior type in Step S202.

Then, the generation unit 135 generates the user behavior information file F21 based on data acquired by decomposing the user information for each predetermined behavior type in Step S203. Thereafter, the generation unit 135 stores the user behavior information file F21 in the behavior data memory unit 123 in Step S204. As above, the process of generating the user behavior information that is performed by the advertising device 100 is completed.

Next, the process of extracting users that is performed by the advertising device 100 according to the embodiment will be described with reference to FIG. 10. FIG. 10 is a flowchart that illustrates the sequence of the process of extracting users that is performed by the advertising device 100 according to the embodiment.

As illustrated in FIG. 10, the request receiving unit 136 determines whether or not a request for using the user information relating to an advertisement delivery has been received from the advertiser device 20 in Step S301. Then, in a case where the request for using the user information has not been received (No in Step S301), the request receiving unit 136 waits until the request is received.

On the other hand, in a case where the request for using the user information has been received by the request receiving unit 136 (Yes in Step S301), in order to extract users corresponding to the request from the advertiser device 20, the extraction unit 137 sets item data in Step S302.

Thereafter, the extraction unit 137 extracts the number of users relating to the behavior history corresponding to the item data based on the user behavior information in Step S303. Then, the extraction unit 137 transmits information relating to the extracted number of users to the advertiser device 20 in Step S304.

Subsequently, the request receiving unit 136 determines whether or not a request indicating an actual advertisement delivery has been received from the advertiser device 20 that has received the information relating to the number of users in Step S305. Then, in a case where the request indicating the advertisement delivery has not been received (No in Step S305), the request receiving unit 136 waits until the use of the user information is received.

On the other hand, in a case where the request indicating an actual advertisement delivery has been received by the request receiving unit 136 (Yes in Step S305), the extraction unit 137 generates a user list used for specifying users to which the advertisement is actually delivered in Step S306.

Then, the delivery unit 138 performs the process for delivering the advertisement to the user terminals 10 based on the user list generated by the extraction unit 137. As above, the process of extracting users that is performed by the advertising device 100 is completed.

5. Modified Example

The above-described advertising device 100 may be performed in various embodiments other than the above-described embodiment. Thus, hereinafter, other embodiments of the advertising device 100 will be described.

5-1. Use of Plurality of Behavior Types

In the data processing according to the above-described embodiment, an example has been illustrated in which, in order to respond to the request received from the advertiser, the extraction unit 137 extracts users from one user behavior information file F21. However, the extraction unit 137 may be configured to compose each user behavior information corresponding to the request out of the user behavior information for each behavior type that is generated by the generation unit 135 and extract users satisfying the request from the user behavior information after the composing operation. This point will be described with reference to FIG. 11.

Figure 11:
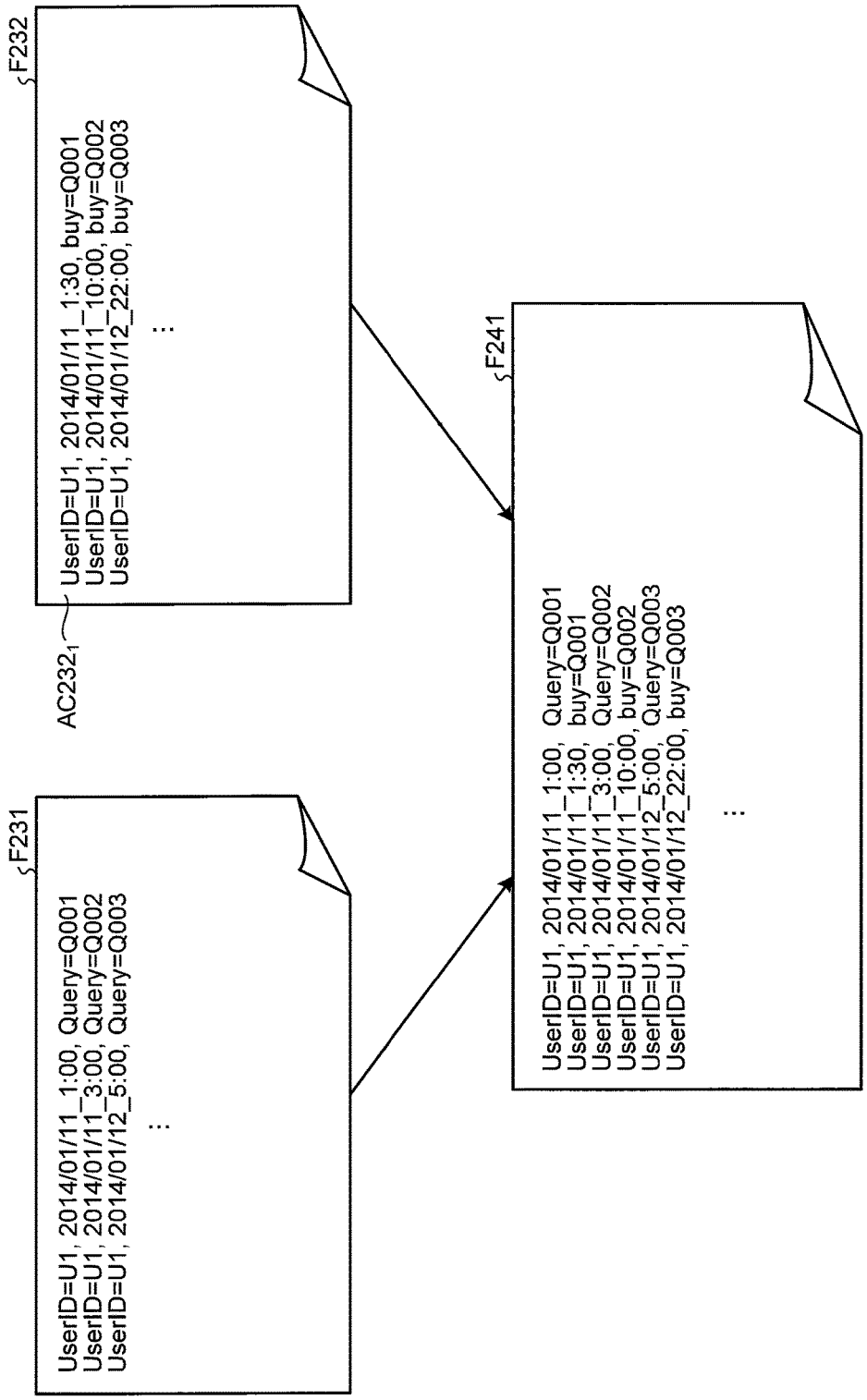
FIG. 11 is a diagram that illustrates an example of an extraction process according to a modified example.

FIG. 11 is a diagram that illustrates an example of an extraction process according to a modified example. A behavior data memory unit 123 according to the modified example stores a user behavior information file F231 and a user behavior information file F232. In addition, in the user behavior information file F231, a search history of a user identified by a user ID "U1" is represented. In addition, in a user behavior information file F232, a product purchase history of a user identified by the user ID "U1" is represented. Here, in the user behavior information file $F23_2$ illustrated in FIG. 11, "buy" represents a purchase behavior, and "Q001", "Q002", and "Q003" represent names such as product names. In other words, user behavior data $AC232_1$ illustrated in FIG. 11 represents that a user identified by the user ID "U1" purchased a product that is identified by a name "Q001" at "1:30 on Jan. 11, 2014".

In a case where the request receiving unit 136 receives a request from the advertiser device 20, the extraction unit 137 acquires two user behavior information files F231 and F232 corresponding to the request by referring to the behavior data memory unit 123. Then, the extraction unit 137 composes the two user behavior information files F231 and F232 of which the behavior types are different from each other, for example, in descending order of the date and time of the behavior history.

As illustrated in FIG. 11, the extraction unit 137 generates a user behavior information file F241 by composing the two user behavior information files F231 and F232.

Such a composing process may be performed, for example, when the request receiving unit 136 is requested to extract "users who, after searching for a predetermined product at one web site, purchased the product" from the advertiser device 20. In such a case, the extraction unit 137 refers to two user behavior information files F231 and F232 decomposed for the behavior types of "search" and "purchase". In addition, the extraction unit 137, based on the content of the request of "after searching", arranges the two user behavior information files F231 and F232 in descending order of the date and time of the behavior history, thereby determining that the request can be responded. In this case, the extraction unit 137 composes two user behavior information files F231 and F232.

In this way, the extraction unit 137 composes each user behavior information corresponding to the request among the user behavior information for each behavior type and can extract users satisfying the request from the user behavior information after the composing operation. Accordingly, the extraction unit 137 can extract users in response to a detailed request from the advertiser.

In addition, the extraction unit 137 is not limited to composing the two user behavior information files F231 and F232 after referring thereto. More specifically, in a case where the extraction unit 137 determines that users satisfying the request can be extracted from each user behavior information without composing the two user behavior information files F231 and F232, the composing operation is not necessary. In such a case, the extraction unit 137 extracts users satisfying the request from each user behavior information corresponding to the request out of the user behavior information for each behavior type generated by the generation unit 135.

5-2. Parallel Processing

In the above-described data processing according to the embodiment, an example has been illustrated in which the extraction unit 137 transmits the information relating to the extracted number of users to the advertiser device 20, waits for a consent from the advertiser device 20, and performs the process of specifying users. However, the extraction unit 137 may perform the counting process for counting the number of users satisfying the request and the extraction process for extracting users satisfying the request in a parallel manner. In other words, the extraction unit 137, without waiting for a consent from the advertiser device 20, may specify extracted users and generate the user list file F51. This point will be described with reference to FIG. 12.

Figure 12:
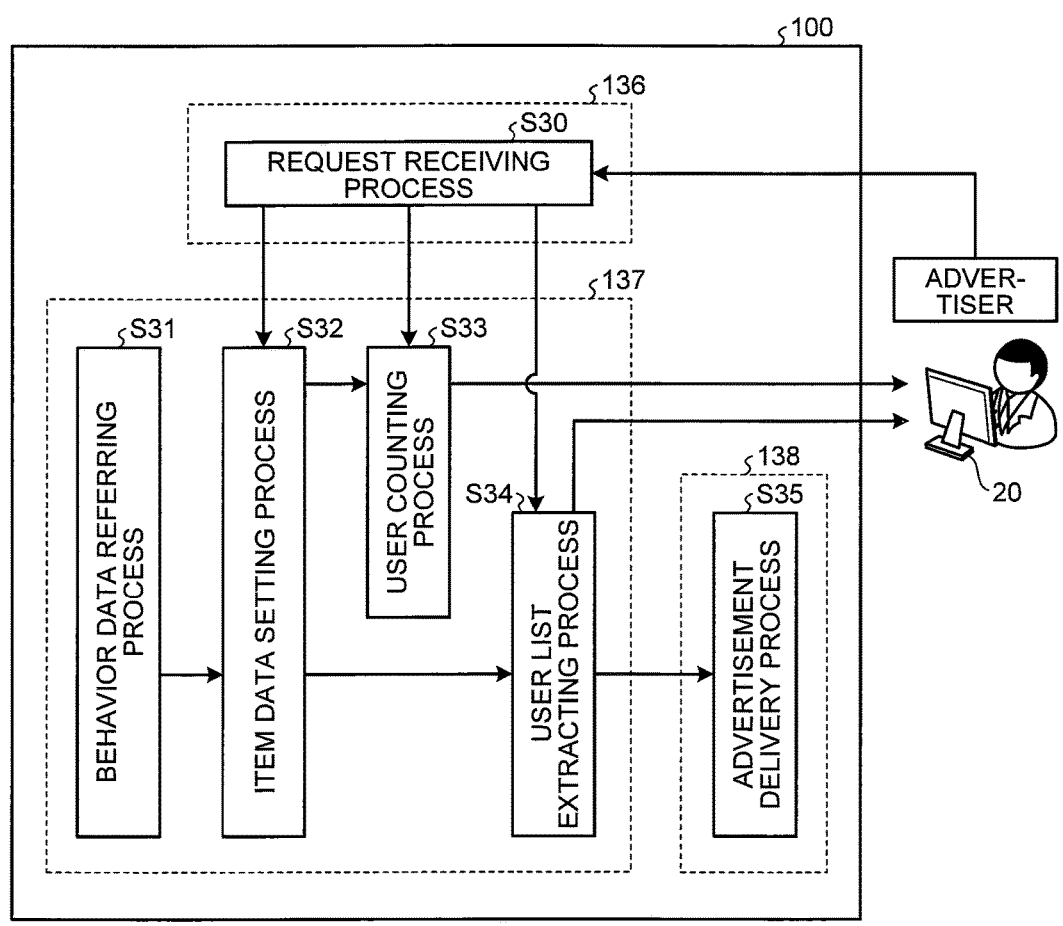
FIG. 12 is a diagram that illustrates an example of an extraction process according to a modified example.

FIG. 12 is a diagram that illustrates an example of the extraction process according to the modified example. Steps S30 to S32 and S35 illustrated in FIG. 12 correspond to Steps S20 to S22 and S25 illustrated in FIG. 7, and thus, the description thereof will not be presented.

The extraction unit 137, for the set item, extracts corresponding users from the category classification file F31 and counts the extracted users in Step S33. The extraction unit 137 according to the modified example, in this process, extracts users that are the targets for an advertisement delivery. Then, the extraction unit 137 specifies extracted users and generates the user list file F51 in Step S34. In other words, the extraction unit 137 performs the counting process for counting the number of users satisfying the request from the advertiser and the extraction process for extracting users satisfying the request in a parallel manner.

As described above in the embodiment, since the extraction unit 137 counts users from the data that is configured by only a user ID and behavior histories, and a result of the processing can be returned to the advertiser at high speed. In addition, since the extraction unit 137 performs the process of extracting users relating to an advertisement delivery in parallel with the counting process, in a case where a request indicating an advertisement delivery is received from the advertiser device 20, the process for an advertisement delivery can advance as soon as possible.

5-3. Use Target

In a case where an advertiser serves also as a supervisor of the site providing device 30, the advertising device 100 can deliver an advertisement in accordance with a request from the advertiser by using the user information so as to respond to the advertiser. This point will be described below.

For example, the extraction unit 137 extracts users satisfying a request, which is received by the request receiving unit 136, by using the user behavior information corresponding to the site providing device 30 managed by the advertiser out of the user behavior information for each site providing device 30 that is generated by the generation unit 135. In other words, in a case where the advertiser serves also as a supervisor of the site providing device 30, in the process of extracting users in accordance with a request from the advertiser, the extraction unit 137 performs extraction using the user information in which a key corresponding to the advertiser is included, and user information in which a key corresponding to any other advertiser is included is not used for the extraction process.

Accordingly, in a case where the advertiser operating the advertiser device 20 also serves as a supervisor of the site providing device 30, the advertiser can deliver his advertisement so as to track a visited user by using the user information relating to users who have visited a web site managed by him. In other words, the advertiser can determine users to which the advertisement is delivered by narrowing down the target users to users who have visited the web site managed by him, and accordingly, an advertisement delivery having a high advertising effect can be performed through a so-called retargeting delivery.

In addition, by using the user behavior information for each site providing device 30 when the advertising device 100 responds to a request from the advertiser device 20 as described above, a restriction may be applied on the user of the information. In other words, the advertising device 100 may limit the user information used by the advertiser to the user information relating to users who have visited the web site managed by the advertiser. Accordingly, for example, when the user information relating to users who have visited web sites managed by other advertisers is used, the advertising device 100 can ask the advertiser charging and the like.

5-4. Reception Data

In the data processing according to the embodiment described above, an example has been illustrated in which the reception unit 131 receives the user information in a case where the user terminal 10 accesses the web site provided by the site providing device 30. However, the reception unit 131 is not limited to the case where the user terminal 10 accesses the web site provided by the site providing device 30 but may receive the user information from the user terminal 10. This point will be described below.

As described above, the reception-unit 131 according to the embodiment receives the user information from the user terminal 10 by using the notification function such as a web beacon embedded in a web site provided by the site providing device 30. In other words, in a case where the user terminal 10 accesses a web site not having the above-described notification function, the reception unit 131 cannot receive the user information.

However, in a case where a web site that is accessed by the user terminal 10 is provided by a web server that is managed by the same management device as the management device (for example, a front end server) managing the advertising device 100, the reception unit 131 can receive the user information from the user terminal 10. In other words, when the user terminal 10 accesses a web site provided by a web server managed by the management device, the user terminal 10 transmits the user information of the user terminal 10 to the management device. This is realized by transmitting a cookie or the like to the management device from the user terminal 10. In such a case, the user information transmitted by the user terminal 10 is transmitted to the reception unit 131 that is included in the advertising device 100 through the management device. Therefore, the reception unit 131 can receive the user information of the user terminal 10 not through the site providing device 30.

In such a case, the reception unit 131 receives the user information not through the site providing device 30, and the first storage unit 132 stores the user information that is received not through the site providing device 30 in the first memory unit 121. In addition, the second storage unit 133 stores the user information that is received not through the site providing device 30 in a management area of the inside of the second memory unit 122 that is different from the management area in which the user information received through the site providing device 30 is stored.

In addition, in a case where the user terminal 10 corresponding to the user information accumulated not through the site providing device 30 accesses the site providing device 30, the reception unit 131 receives the user information that includes the same user ID "U1" as the user ID "U1" included in the user information accumulated not through the site providing device 30. In other words, the reception unit 131 can receive the same user ID "U1" from the user identification information of the user terminal 10 regardless whether the user information is the user information acquired through the site providing device 30 or the user information acquired not through the site providing device 30. This is realized by the user terminal 10 accessing the web site using the same browser and transmitting a cookie corresponding to the site providing device 30 and the management device from the user terminal 10.

Furthermore, the acquisition unit 134 acquires not only the user information acquired through the site providing device 30, which is received by the reception unit 131, but also the user information accumulated not through the site providing device 30. Then, the generation unit 135 individually generates the user behavior information for each site providing device 30 that is acquired by decomposing the user information acquired through the site providing device 30 and the user behavior information acquired by decomposing the user information accumulated not through the site providing device 30. In other words, the generation unit 135 can individually generate the user behavior information using the user information acquired through the site providing device 30 and generate the user behavior information using the user information acquired not through the site providing device 30 by referring to the key included in the user information.

In such a case, the extraction unit 137 can extract users satisfying the request received by the request receiving unit 136 by using the user behavior information generated from the user information accumulated not through the site providing device 30 out of the user behavior information generated by the generation unit 135.

Accordingly, the advertising device 100 can allow the user information acquired through the management device to be used by the advertiser even the user information is the user information acquired not through the site providing device 30 managed by the advertiser. In other words, the advertiser can use both the user information acquired through the site providing device 30 managed by the advertiser and the user information acquired through the management device managing the advertising device 100 for the advertisement delivery.

5-5. Data Use

In the above-described embodiment, an advertisement delivery using the data processing performed by the advertising device 100 has been described. However, the user-information generated by the data processing according to the embodiment is not limited to the form used for an advertisement delivery but may be used for other various purposes. This point will be described below.

For example, the user behavior file F21 and the category classification file F31 generated by the advertising device 100 is not limited to be used by the advertiser, but such files may be used by other data users. More specifically, such a data user may perform a behavior (for example, a mail delivery to extracted users) for acquiring new users based on the user behavior file F21 and the like generated by the advertising device 100. For example, the data user may acquire user's responses for persons (for example, a competitor or the like) other than the data-user or behaviors at a web site based on the user information collected by the advertising device 100. In other words, since the data user can accurately acquire user's taste or user's interest in products by acquiring the user information, an activity for acquiring users with higher accuracy can be performed.

As the user information provided for the data user as described above, for example, user information acquired through the management device that manages the advertising device 100 or the like may be considered. In addition, the advertising device 100, for example, may provide the user information that is acquired through the site providing device 30 operated by a competitor of the data user. Furthermore, for the data user, the advertising device 100 may not only provide the data but also provide services using the user information.

More specifically, the advertising device 100 may provide a web page carrying an advertisement corresponding to data users or displaying a recommendation for the data users using the web server that is managed by the same management device as that of the advertising device 100. In addition, the advertising device 100 may provide a landing page optimization (LPO) service for optimizing a page (landing page) that is displayed first on the web page for users extracted in the data processing.

In addition, the advertising device 100 may be provided with user information data other than the data collected by the advertising device 100 from the data user for providing the above-described service. In other words, the advertising device 100 may form a data linkage between the user information collected by the advertising device 100 and the user information maintained by the data user. For example, it is assumed that a predetermined user reads information of vehicles that are products on a web site provided by a data user who is an automotive maker. In addition, it is assumed that the user reads information of vehicles of a sport type provided by another automotive maker at a web site that is managed by the same management device as that of the advertising device 100. In such a case, the advertising device 100 presents all the information read by the user to the data user as the user behavior information. Accordingly, in a case where information is provided for the user, the data user can provide information of sport-type vehicles by priority. In addition, in the LPO described above, the advertising device 100 can present a web page on which a sport-type vehicle provided by the data user is displayed or a web page on which a relating advertising content is displayed to the user.

In this way, the advertising device 100 can analyze products and the like in which the user is interested with high accuracy. In addition, for the data user, a product or information corresponding to the user can be provided with higher accuracy. In other words, the advertising device 100 can be used by the data user as customer relationship management (CRM) that is an information system improving customer satisfaction through the collection and the analysis of user information.

6. Hardware Configuration

Figure 13:
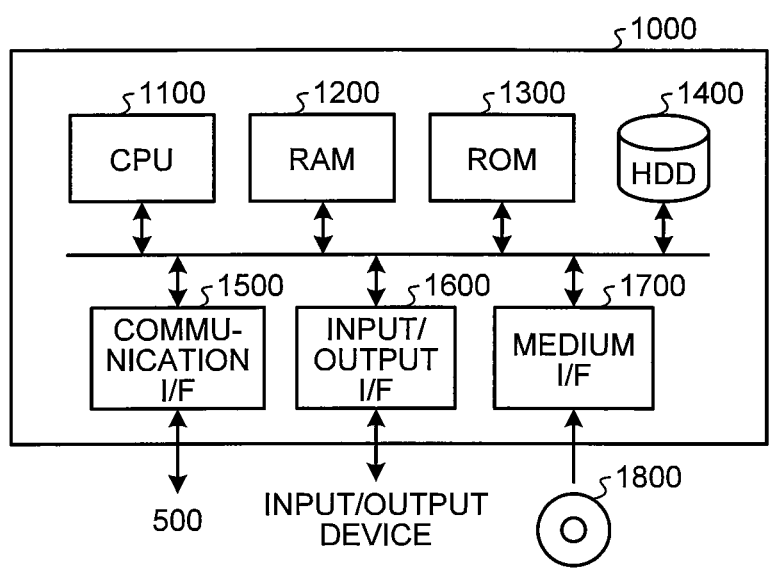
FIG. 13 is a hardware configuration diagram that illustrates an example of a computer that realizes the function of an advertising device.

The advertising device 100 according to the above-described embodiment, for example, is realized by a computer 1000 as illustrated in FIG. 13. Hereinafter, the advertising device 100 will be described as an example. FIG. 13 is a hardware configuration diagram that illustrates an example of the computer 1000 that realizes the function of the advertising device 100. The computer 1000 includes: a CPU 1100; a RAM 1200; a ROM 1300; an HDD 1400; a communication interface (I/F) 1500; an input/output interface (I/F) 1600; a medium interface (I/F) 1700.

The CPU 1100 operates based on a program stored in a ROM 1300 or an HDD 1400, and thereby controlling each unit. The ROM 1300 stores a booting program executed by the CPU 1100 at the time of start-up of the computer 1000, a program depending on the hardware of the computer 1000, and the like.

The HDD 1400 stores a program executed by the CPU 1100, data used by the program, and the like. The communication interface 1500 receives data from other devices through a communication network 500 (corresponding to the network N illustrated in FIG. 2), transmits the received data to the CPU 1100, and transmits data generated by the CPU 1100 to the other devices through the communication network 500.

The CPU 1100 controls output devices such as a display and a printer and input devices such as a keyboard and a mouse through the input/output interface 1600. The CPU 1100 acquires data from input device through the input/output interface 1600. In addition, the CPU 1100 outputs generated data to the output devices through the input/output interface 1600.

The medium interface 1700 reads a program or data stored on a recording medium 1800 and provides the read program or data for the CPU 1100 through the RAM 1200. The CPU 1100 loads the program on the RAM 1200 from the recording medium 1800 through the medium interface 1700 and executes the loaded program. The recording medium 1800, for example, is an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 serves as the advertising device 100 according to the embodiment, the CPU 1100 of the computer 1000 executes a program loaded on the RAM 1200, thereby realizing the function of the control unit 130. In addition, in the HDD 1400, data of the inside of the memory unit 120 is stored. While the CPU 1100 of the computer 1000 reads the program from the recording medium 1800 and executes the read program, as another example, the program may be acquired from another device through the communication network 500.

7. Others

Among the processes described in the above-described embodiment, all or some of the processes described to be automatically performed may be manually performed, or all or some of the processes described to be manually performed may be automatically performed using a known method. In addition, the processing sequence, specific names, information including various kinds of data and parameters illustrated in the description or the drawings may be arbitrarily changed unless otherwise noted. For example, various kinds of information illustrated in each drawing is not limited to the information illustrated in the drawing.

In addition, each constituent element of each device illustrated in the figure is functional and conceptual, and it is not necessary to physically configure each device as illustrated in the drawing. In other words, a specific form of separation/integration of each device is not limited to that illustrated in the drawing, and the whole or a part of each device may be functionally or physically distributed/integrated in an arbitrary unit in accordance with various loads, the use status, and the like. For example, the acquisition unit 134 and the generation unit 135 illustrated in FIG. 3 may be integrated. For example, the information stored in the memory unit 120 may be stored in a memory device included in an external device through the network N.

In addition, the embodiments described above may be appropriately combined in a range in which the processing contents thereof are not contradictory to each other.

8. Advantages

As described above, the advertising device 100 according to the embodiment includes the reception unit 131, the first memory unit 121, the second memory unit 122, and the second storage unit 133 (an example of the storage unit). The reception unit 131 receives the user information relating to the user using the user terminal 10 by being triggered upon an access of the user terminal 10 to the site providing device 30. The first memory unit 121 stores the user information received by the reception unit 131. The second storage unit 133 stores the user information in an area of the second memory unit 122 that is different for each site providing device 30 that is the trigger for the reception of the user information stored in the first memory unit 121.

In this way, the advertising device 100 according to the embodiment can store the user information of which the amount of information is huge so as to be used for an advertisement delivery for each site providing device 30 through which the user information has passed. In other words, the advertising device 100 according to the embodiment can manage the user information in a flexible manner.

In addition, the reception unit 131 receives the user information including the identification information (in other words, the key) used for identifying the site providing device 30. The second storage unit 133, based on the key included in the user information, stores the user information in an area of the second memory unit 122 that is different for each site providing device 30.

In this way, the advertising device 100 according to the embodiment, for the user information, can classify the user information that can be used for each site providing device 30 through which the user information has passed or analyze the behavior of a user visiting a web site of each site providing device 30. Accordingly, the advertising device 100 according to the embodiment can perform an advertisement delivery matching the request from the advertiser.

In addition, the first memory unit 121 is managed to have a period as a period until the user information is deleted after being stored that is different from that of the second memory unit 122.

In this way, the advertising device 100 according to the embodiment can manage the stored user information for a period different for each of the first memory unit 121 and the second memory unit 122. Accordingly, the advertising device 100 can realize flexible management of the user information.

In addition, the second storage unit 133, among the hierarchies of the second memory unit 122 storing data based on a hierarchical structure, stores the user information corresponding to the site providing device 30 in a hierarchy different for each site providing device 30. In addition, the second storage unit 133 stores the user information corresponding to the site providing device 30 in the second memory unit 122 as a file different for each site providing device 30.

In this way, the advertising device 100 according to the embodiment can handle the user information corresponding to each site providing device 30 in response to the requests from individual advertisers.

As above, while several embodiments of the present application have been described in detail with reference to the drawings, these are merely examples, and the present invention can be implemented in other embodiments acquired by applying various modifications or improvements to the embodiments described in "Summary of the Invention" based on the knowledge of those skilled in the art.

In addition, the "unit (the section or the module)" described above may be rephrased by a "means", a "circuit", or the like. For example, the reception unit may be rephrased by a reception means or a reception circuit.

According to the data processing device, the data processing method, and the data processing program relating to the present application can manage the user information in a flexible manner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data processing device comprising:
   one or more memories that store user information in a plurality of memory management areas, the user information being stored in different memory management areas for each different device identification information, the device identification information being used as a key in an index for classifying the user information stored in the different memory management areas; and
   a processor operatively connected to the one or more memories, the processor being programmed to:

receive first user information relating to a first user operating a first user terminal by being triggered upon an access of the first user terminal at a web site provided by the first site providing device, the first user information including device identification information of the first site providing device, user identification information of the first user terminal and first log data regarding the access by the first user terminal that was triggered;

accumulate, by storing in a first memory management area of the one or more memories that is associated with the device identification information of the first site providing device, the received first user information, the first memory management area being a memory management area indicated in the index as for the first information providing device;

receive second user information relating to a second user operating a second user terminal by being triggered upon an access of the second user terminal at a web site provided by the second site providing device, the second user information including identification information of the second site providing device, identification information of the second user terminal and second log data regarding the access by the second user terminal that was triggered;

accumulate, by storing in a second memory management area of the one or more memories that is associated with the device identification information of the second site providing device, the received second user information, the second memory management area being a memory management area indicated in the index as for the second information providing device; and upon receipt, from an advertiser terminal, of a request indicating that an advertisement delivery to users determined to be interested in a specific product or company is desired:

extract, from the memory management area classified in the index with the information providing device associated with the specific product or company, identification information of one or more users that are interested in the specific product or company; and transmit, to the advertiser terminal, presentation information that includes the identification information of the one or more users that are interested in the specific product or company.

2. The data processing device according to claim 1, wherein the first memory management area is managed in accordance with a first period that is a period until the first user information is deleted after being stored, the first period being different from a second period associated with the second memory management area.

3. The data processing device according to claim 1, wherein the first user information and the second user information are stored as different files in the first memory management area and the second memory management area, respectively.

4. The data processing device according to claim 1, wherein the processor is further programmed to:

when receiving from one of the first and second information providing devices a deletion request for the user information associated with the one of the first and second information providing devices, delete the user information stored in the one or more memories that is associated with the one of the first and second information providing while maintaining the user information stored in the one or more memories that is associated with the other one of the first and second information providing devices; and when restoring the deleted user information, restore the deleted user information based on the user information stored in the memory management area corresponding to the other one of the first and second information providing devices and store the restored user information in the memory management area corresponding to the one of the first and second information providing devices.

5. The data processing device according to claim 1, wherein search histories are included as a user's behavior history in each of the first user information and the second user information.

6. The data processing device according to claim 1, wherein purchases are included as a user's behavior history in each of the first user information and the second user information.

7. The data processing device according to claim 1, wherein the receiving of the first user information includes receiving the first user information via a first notification function embedded in the web site that is provided by the first site providing device.

8. The data processing device according to claim 7, wherein the receiving of the second user information includes receiving via a second notification function embedded in the web site that is provided by the second site providing device.

9. The data processing device according to claim 1, wherein the processor is further programmed to:

delete the user information stored in the other memory with a first storage period, the first storage period being a period until the user information is deleted after being stored in the other memory, and delete the user information stored in the one or more memories with a second storage period, the second storage period being a period until the user information, which is stored in the different memory management areas for each different device identification information, is deleted after being stored in the one or more memories; and the first storage period of the other memory and the second storage period of the one or more memories are different from each other.

10. A data processing method performed by a computer, the data processing method comprising:

receiving first user information relating to a first user operating a first user terminal by being triggered upon an access of the first user terminal at a web site provided by the first site providing device, the first user information including device identification information of the first site providing device, user identification information of the first user terminal and first log data regarding the access by the first user terminal that was triggered;

accumulating, by storing in a first memory management area of one or more memories that is associated with the device identification information of the first site providing device, the received first user information, the one or more memories storing user information in a plurality of memory management areas, the user information being stored in different memory management areas for each different device identification information, the device identification information being used as a key in the index for classifying the user information stored in the different memory management areas, the first memory management area being a memory management area indicated in the index as for the first information providing device;

receiving second user information relating to a second user operating a second user terminal by being triggered upon an access of the second user terminal at a web site provided by the second site providing device, the second user information including identification information of the second site providing device, identification information of the second user terminal and second log data regarding the access by the second user terminal that was triggered;

accumulating, by storing in a second memory management area of the one or more memories that is associated with the device identification information of the second site providing device, the received second user information, the second memory management area being a memory management area indicated in the index as for the second information providing device; and upon receipt, from an advertiser terminal, of a request indicating that an advertisement delivery to users determined to be interested in a specific product or company is desired:

extracting, from the memory management area classified in the index with the information providing device associated with the specific product or company, identification information of one or more users that are interested in the specific product or company; and transmitting, to the advertiser terminal, presentation information that includes the identification information of the one or more users that are interested in the specific product or company.

11. A non-transitory computer readable storage medium containing program instructions that, when executed by one or more processors of a computer, cause the computer to:

receive first user information relating to a first user operating a first user terminal by being triggered upon an access of the first user terminal at a web site provided by the first site providing device, the first user information including device identification information of the first site providing device, user identification information of the first user terminal and first log data regarding the access by the first user terminal that was triggered;

accumulate, by storing in a first memory management area of one or more memories that is associated with the device identification information of the first site providing device, the received first user information, the one or more memories storing user information in a plurality of memory management areas, the user information being stored in different memory management areas for each different device identification information, the device identification information being used as a key in the index for classifying the user information stored in the different memory management areas, the first memory management area being a memory management area indicated in the index as for the first information providing device;

receive second user information relating to a second user operating a second user terminal by being triggered upon an access of the second user terminal at a web site provided by the second site providing device, the second user information including identification information of the second site providing device, identification information of the second user terminal and second log data regarding the access by the second user terminal that was triggered;

accumulate, by storing in a second memory management area of the one or more memories that is associated with the device identification information of the second site providing device, the received second user information, the second memory management area being a memory management area indicated in the index as for the second information providing device; and upon receipt, from an advertiser terminal, of a request indicating that an advertisement delivery to users determined to be interested in a specific product or company is desired:

extract, from the memory management area classified in the index with the information providing device associated with the specific product or company, identification information of one or more users that are interested in the specific product or company; and transmit, to the advertiser terminal, presentation information that includes the identification information of the one or more users that are interested in the specific product or company.

\* \* \* \* \*